(12) United States Patent
Dilworth

(10) Patent No.: US 9,568,033 B2
(45) Date of Patent: *Feb. 14, 2017

(54) SYSTEMS AND METHODS FOR IMPROVING BOLTED JOINTS

(71) Applicant: Hendrickson USA, L.L.C., Itasca, IL (US)

(72) Inventor: Damon E. Dilworth, Channahon, IL (US)

(73) Assignee: Hendrickson USA, L.L.C., Itasca, IL (US)

( * ) Notice: Subject to any disclaimer, the term of this patent is extended or adjusted under 35 U.S.C. 154(b) by 324 days.

This patent is subject to a terminal disclaimer.

(21) Appl. No.: 13/834,318

(22) Filed: Mar. 15, 2013

(65) Prior Publication Data

US 2014/0259626 A1    Sep. 18, 2014

(51) Int. Cl.
*F16B 35/02* (2006.01)
*F16B 5/02* (2006.01)

(52) U.S. Cl.
CPC ........ *F16B 5/0258* (2013.01); *Y10T 29/49948* (2015.01)

(58) Field of Classification Search
CPC .................. F16B 5/0258; Y10T 29/49948
USPC .......... 411/34, 44, 45, 383, 367, 371, 408.1; 403/408.1
See application file for complete search history.

(56) References Cited

U.S. PATENT DOCUMENTS

| | | | | |
|---|---|---|---|---|
| 1,382,606 A | * | 6/1921 | Norton ........................ | 403/253 |
| 1,596,856 A | * | 8/1926 | Setlow ...................... | F16B 3/06 411/75 |
| 1,710,416 A | * | 4/1929 | Goeller ........................ | 439/431 |
| RE17,880 E | * | 11/1930 | Stoeltzlen ..................... | 439/791 |
| 2,060,970 A | * | 11/1936 | Belden ............................ | 16/404 |
| 2,328,987 A | * | 9/1943 | Martin ......................... | 248/554 |
| 2,443,466 A | * | 6/1948 | Lord ....................... | F16B 39/36 411/45 |

(Continued)

FOREIGN PATENT DOCUMENTS

DE    10 2007 044404 A1    3/2009
WO    WO 98/37333 A1    8/1998

OTHER PUBLICATIONS

Invitation to Pay Additional Fees and Partial International Search for PCT Patent Appl'n. No. PCT/US2014/017575, dated Oct. 23, 2014.

(Continued)

*Primary Examiner* — Gary Estremsky
(74) *Attorney, Agent, or Firm* — Cook Alex Ltd.

(57) ABSTRACT

A mechanical fastener assembly is provided for joining two or more workpieces. The assembly includes a mechanical fastener and a slotted collar. The mechanical fastener has a shaft received within aligned bores of the workpieces, while the slotted collar surrounds at least a portion of the shaft and is also received within the aligned bores. Inserting and advancing the slotted collar into the aligned bores causes the slot of the slotted collar to at least partially close, thereby causing an inner surface of the slotted collar to engage at least a portion of the shaft of the mechanical fastener and an outer surface of the slotted collar to engage at least a portion of the aligned bores of the two workpieces. Such a mechanical fastener assembly can effectively transform a bolted joint into a stronger shear joint.

13 Claims, 24 Drawing Sheets

(56) References Cited

U.S. PATENT DOCUMENTS

| | | | | |
|---|---|---|---|---|
| 2,499,315 | A * | 2/1950 | Johnson | F16B 19/1027 411/360 |
| 2,506,499 | A * | 5/1950 | Gibson | B02C 15/02 241/129 |
| 2,639,621 | A * | 5/1953 | Harris et al. | 474/41 |
| 3,009,747 | A * | 11/1961 | Pitzer | F16D 1/094 188/67 |
| 3,386,724 | A | 6/1968 | Chieger at al. | |
| 4,637,135 | A * | 1/1987 | Grabbe | H05K 3/303 29/832 |
| 4,743,138 | A | 5/1988 | Goy | |
| 5,039,245 | A * | 8/1991 | Hansen | 403/370 |
| 5,110,244 | A * | 5/1992 | Garman | F16B 19/05 29/520 |
| 5,474,403 | A * | 12/1995 | Hetrich | F16D 1/094 403/369 |
| 5,486,079 | A * | 1/1996 | Martin | B62D 25/188 280/851 |
| 5,692,865 | A * | 12/1997 | Pratt | A43C 15/02 403/370 |
| 5,704,752 | A * | 1/1998 | Logerot | F16B 19/1081 403/248 |
| 5,803,686 | A * | 9/1998 | Erbes et al. | 411/55 |
| 5,855,462 | A * | 1/1999 | Weiss | 411/383 |
| 5,921,570 | A | 7/1999 | Lie | |
| 6,352,245 | B1 | 3/2002 | Norden | |
| 6,406,008 | B1 | 6/2002 | Dudding et al. | |
| 6,540,462 | B1 | 4/2003 | Bretschneider et al. | |
| 6,568,757 | B2 * | 5/2003 | Lin | A47C 3/026 248/161 |
| 7,207,583 | B2 | 4/2007 | Ross et al. | |
| 7,922,213 | B2 | 4/2011 | Werth | |
| 7,959,172 | B2 | 6/2011 | Nashawaty et al. | |
| 8,136,825 | B2 | 3/2012 | Luna | |
| 2002/0015617 | A1 | 2/2002 | Schwenkel et al. | |
| 2004/0033105 | A1 * | 2/2004 | North | 403/408.1 |
| 2006/0033298 | A1 | 2/2006 | Longworth et al. | |
| 2007/0297869 | A1 | 12/2007 | Kunda | |
| 2010/0195944 | A1 | 8/2010 | Verbowski | |
| 2010/0278608 | A1 * | 11/2010 | Toosky | F16B 33/004 411/45 |
| 2010/0329780 | A1 * | 12/2010 | Fruh | H01Q 1/1207 403/408.1 |
| 2011/0285101 | A1 | 11/2011 | Henksmeier et al. | |
| 2012/0056469 | A1 | 3/2012 | Bubulka et al. | |
| 2014/0138929 | A1 | 5/2014 | Wilson et al. | |

OTHER PUBLICATIONS

International Search Report and Written Opinion for PCT Patent Appl'n. No. PCT/US2014/017553, dated Oct. 16, 2014.

Office Communication for U.S. Appl. No. 13/959,810, dated Mar. 21, 2016.

Office Communication for U.S. Appl. No. 13/959,810, dated Oct. 6, 2015.

* cited by examiner

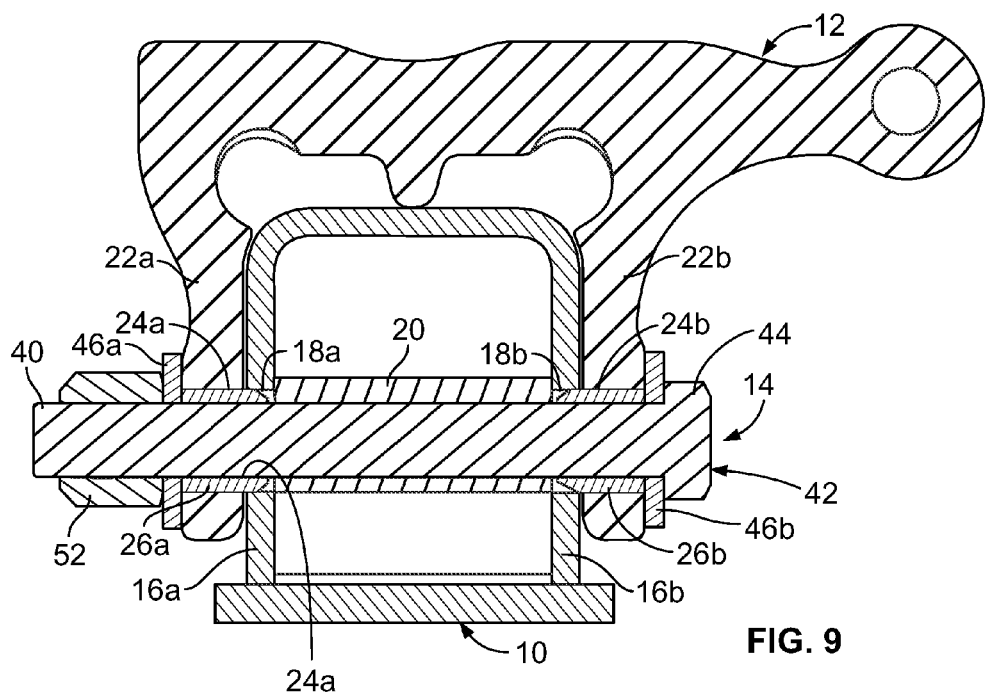
FIG. 9
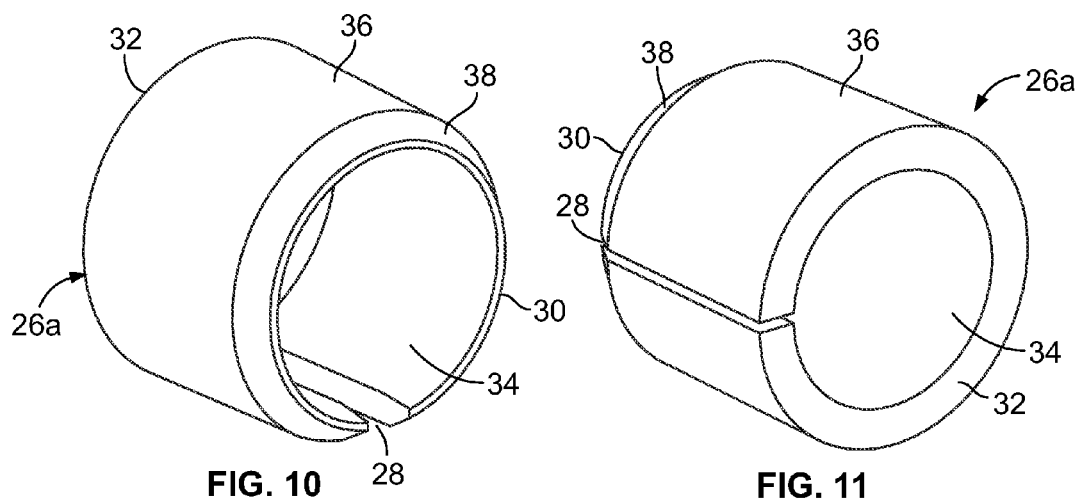
FIG. 10
FIG. 11

SYSTEMS AND METHODS FOR IMPROVING BOLTED JOINTS

FIELD OF THE DISCLOSURE

The present subject matter relates to bolted joints. More particularly, the present subject matter relates to methods and systems for strengthening bolted joints.

DESCRIPTION OF RELATED ART

It is well known to secure two or more components of an assembly together using mechanical fasteners. Among the typical mechanical fasteners used, which depend upon a number of factors, are bolts and rivets. Each type of mechanical fastener has strengths and weaknesses. Compared to a rivet, a bolt is typically much easier to service, as it is typically readily inserted and removed as required, whereas rivets are typically not intended to be removed and serviced. In contrast, a riveted joint is typically stronger than a bolted joint, as a bolt merely creates friction between the joined components to secure the joint, whereas a rivet creates a stronger shear joint. As such, a relatively great number of bolts and/or relatively heavy bolts must be employed to create a joint that is comparable to a joint secured with fewer and/or lighter rivets.

As both bolts and rivets have their disadvantages, it would be advantageous to be able to provide a mechanical fastener capable of creating a joint with serviceability comparable to a bolt and strength comparable to a rivet.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In one aspect, a mechanical fastener assembly is provided for securing first and second workpieces having aligned bores. The mechanical fastener assembly includes a mechanical fastener and a slotted collar. The mechanical fastener has a shaft configured to be at least partially received within the aligned bores of the first and second workpieces. The slotted collar surrounds at least a portion of the shaft of the mechanical fastener and is configured to be at least partially received within the aligned bores of the first and second workpieces. An inner surface of the slotted collar is configured to engage at least a portion of the shaft of the mechanical fastener and an outer surface of the slotted collar is configured to engage at least a portion of the aligned bores of the first and second workpieces.

In another aspect, a joint comprises first and second workpieces, a mechanical fastener, and a slotted collar. The first workpiece has a first bore and the second workpiece has a second bore aligned with the first bore. The mechanical fastener has a shaft at least partially received within the aligned bores of the first and second workpieces. The slotted collar surrounds at least a portion of the shaft of the mechanical fastener and is at least partially received within the aligned bores of the first and second workpieces. An inner surface of the slotted collar engages at least a portion of the shaft of the mechanical fastener and an outer surface of the slotted collar engages at least a portion of the aligned bores of the first and second workpieces.

In yet another aspect, a method is provided for joining first and second workpieces. A first workpiece having a first bore and a second workpiece having a second bore are provided. The bores of the first and second workpieces are aligned and at least a portion of a slotted collar and at least a portion of a shaft of a mechanical fastener are inserted into the aligned bores. At least a portion of an inner surface of the slotted collar is brought into contact with the shaft of the mechanical fastener. At least a portion of an outer surface of the slotted collar is brought into contact with the aligned bores of the first and second workpieces.

BRIEF DESCRIPTION OF THE DRAWINGS

FIGS. 4-9 are side elevational views showing a process of joining the vehicle axle and suspension system component of FIG. 1 using the mechanical fastener assembly of FIG. 1;

FIGS. 10 and 11 are perspective views of a slotted collar of the mechanical fastener assembly of FIG. 1;

DESCRIPTION OF THE ILLUSTRATED EMBODIMENTS

The embodiments disclosed herein are for the purpose of providing the required description of the present subject matter. They are only exemplary, and may be embodied in various forms and in various combinations. Therefore, specific details disclosed herein are not to be interpreted as limiting the subject matter as defined in the accompanying claims.

Figure 1:
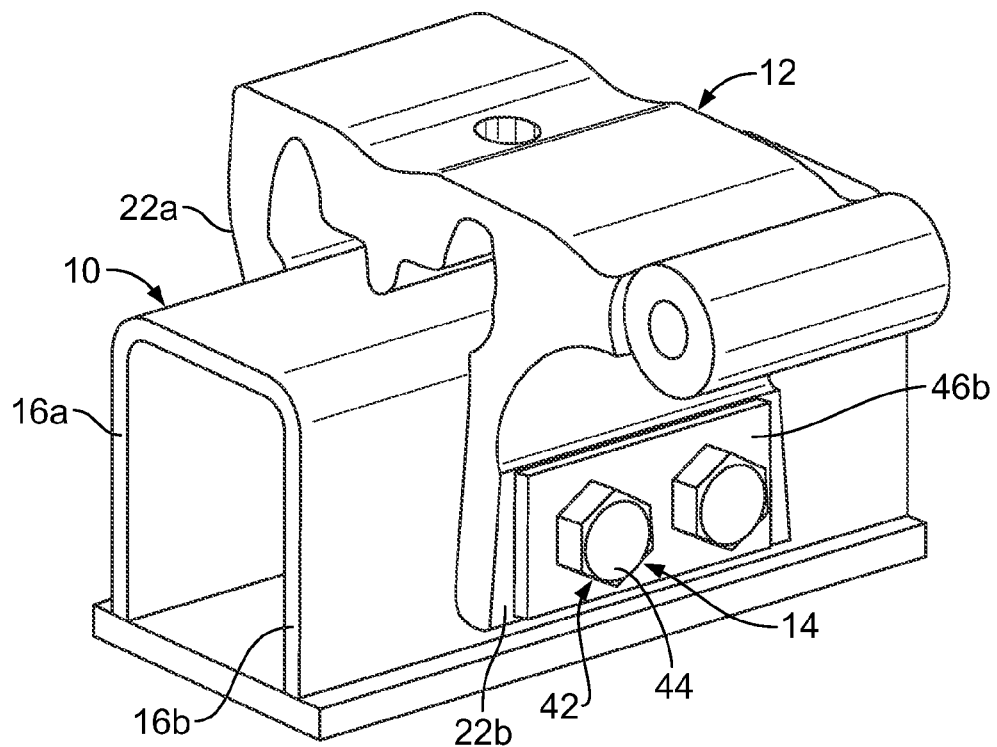
FIG. 1 is a perspective view of two workpieces, shown as a vehicle axle and suspension system component, secured together by a mechanical fastener assembly according to an aspect of the present disclosure.
Figure 2:
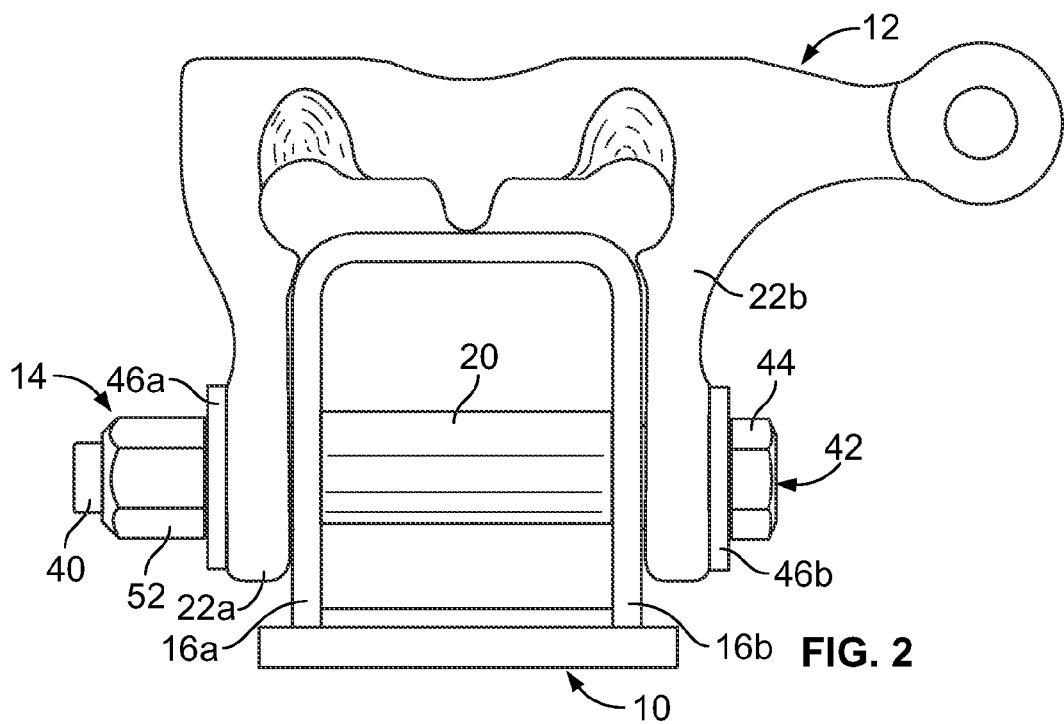
FIG. 2 is a side elevational view of the vehicle axle, suspension system component, and mechanical fastener assembly of FIG. 1.
Figure 3:
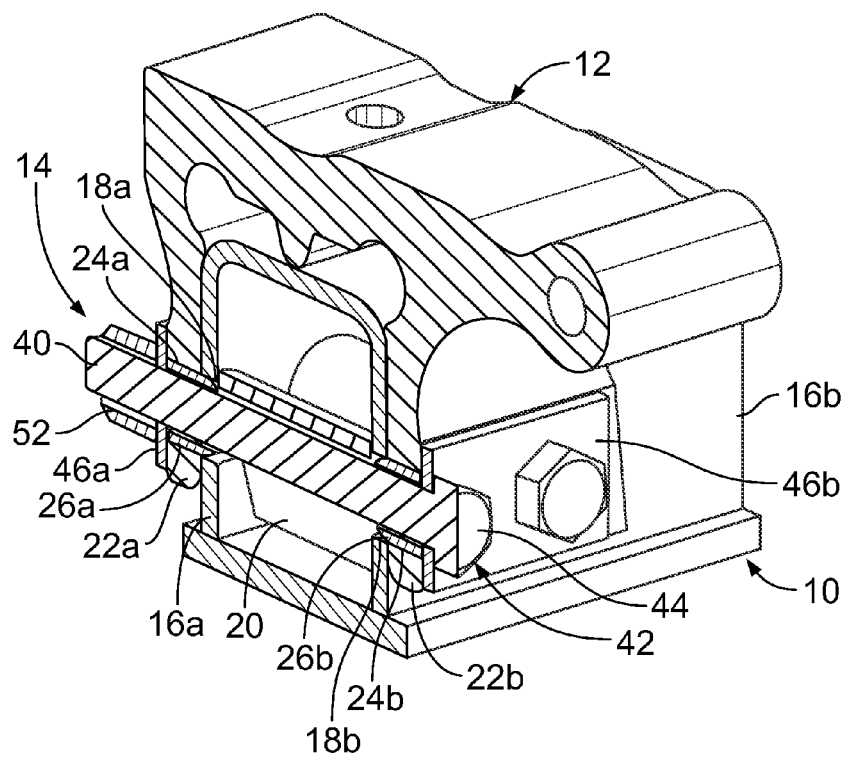
FIG. 3 is a cross-sectional view of the vehicle axle, suspension system component, and mechanical fastener assembly of FIG. 1.
Figure 4:
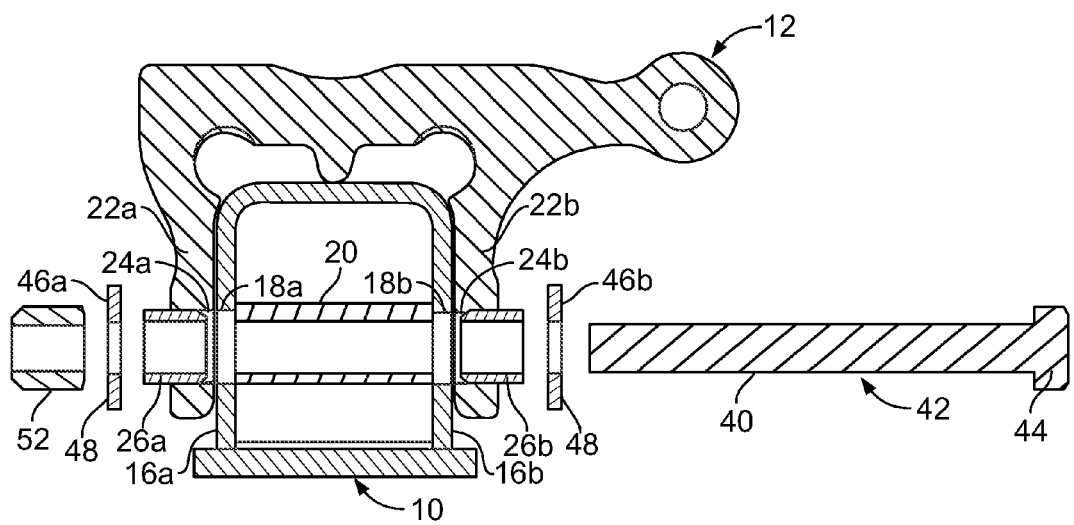

FIGS. 1-3 show a first workpiece 10 and a second workpiece 12 that are joined by a mechanical fastener assembly 14 according to an aspect of the present disclosure. FIGS. 4-9 show an exemplary method of joining the workpieces 10 and 12 using the mechanical fastener assembly 14. In the illustrated embodiment, the first workpiece 10 comprises a vehicle axle and the second workpiece 12 comprises an axle wrap or suspension system component, but mechanical fastener assemblies according to the present disclosure may be employed to join together any of a variety of suitable workpieces. Thus, it should be understood that the workpieces described and illustrated herein are merely exemplary, and that the assemblies and methods described herein may be used in combination with other workpieces without departing from the scope of the present disclosure.

Each workpiece 10 and 12 is provided with a bore or through-hole or aperture for receipt of at least a portion of the mechanical fastener assembly 14, as can be seen in FIGS. 4-9. In the illustrated embodiment, the workpieces 10 and 12 are joined together at multiple locations, such that each workpiece 10, 12 includes a plurality of bores, with multiple mechanical fastener assemblies 14 being employed; however, it is also within the scope of the present disclosure for each workpiece to include only one bore or through-hole or aperture and to join the workpieces using a single mechanical fastener assembly.

Figure 16:
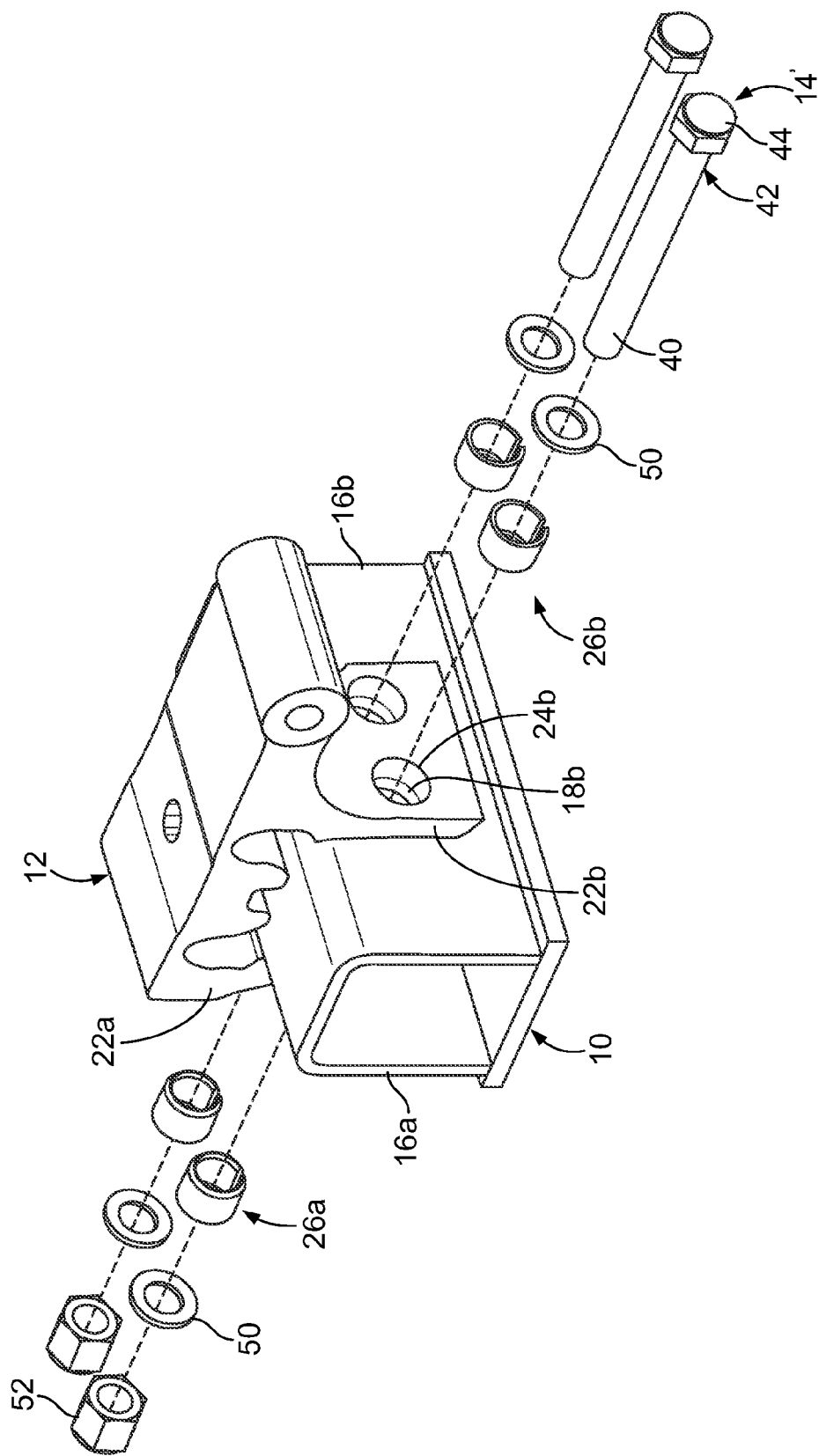
FIG. 16 is an exploded view of the vehicle axle and suspension system component of FIG. 1, shown with an alternative embodiment of a mechanical fastener assembly according to the present disclosure.
Figure 17:
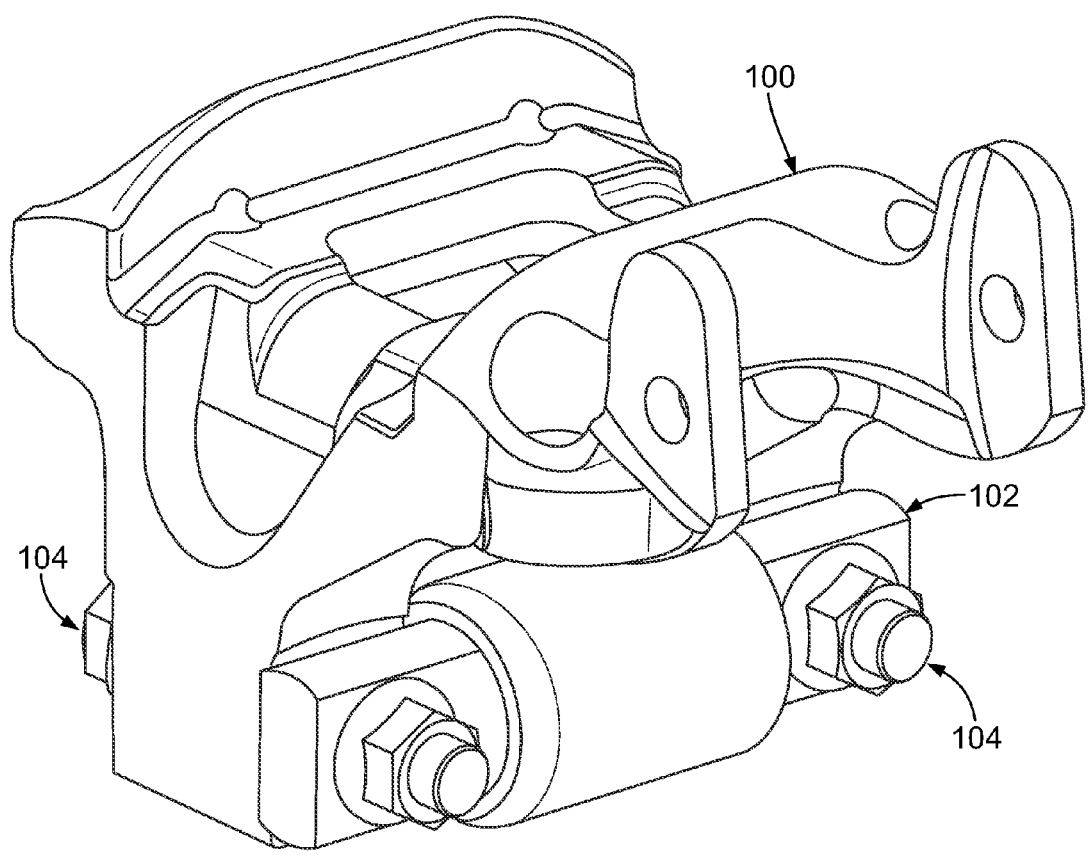
FIG. 17 is a front perspective view of two different workpieces, shown as a bottom cap and D-pin bushing of a vehicle suspension system, secured together by a mechanical fastener assembly according to an aspect of the present disclosure.
Figure 18:
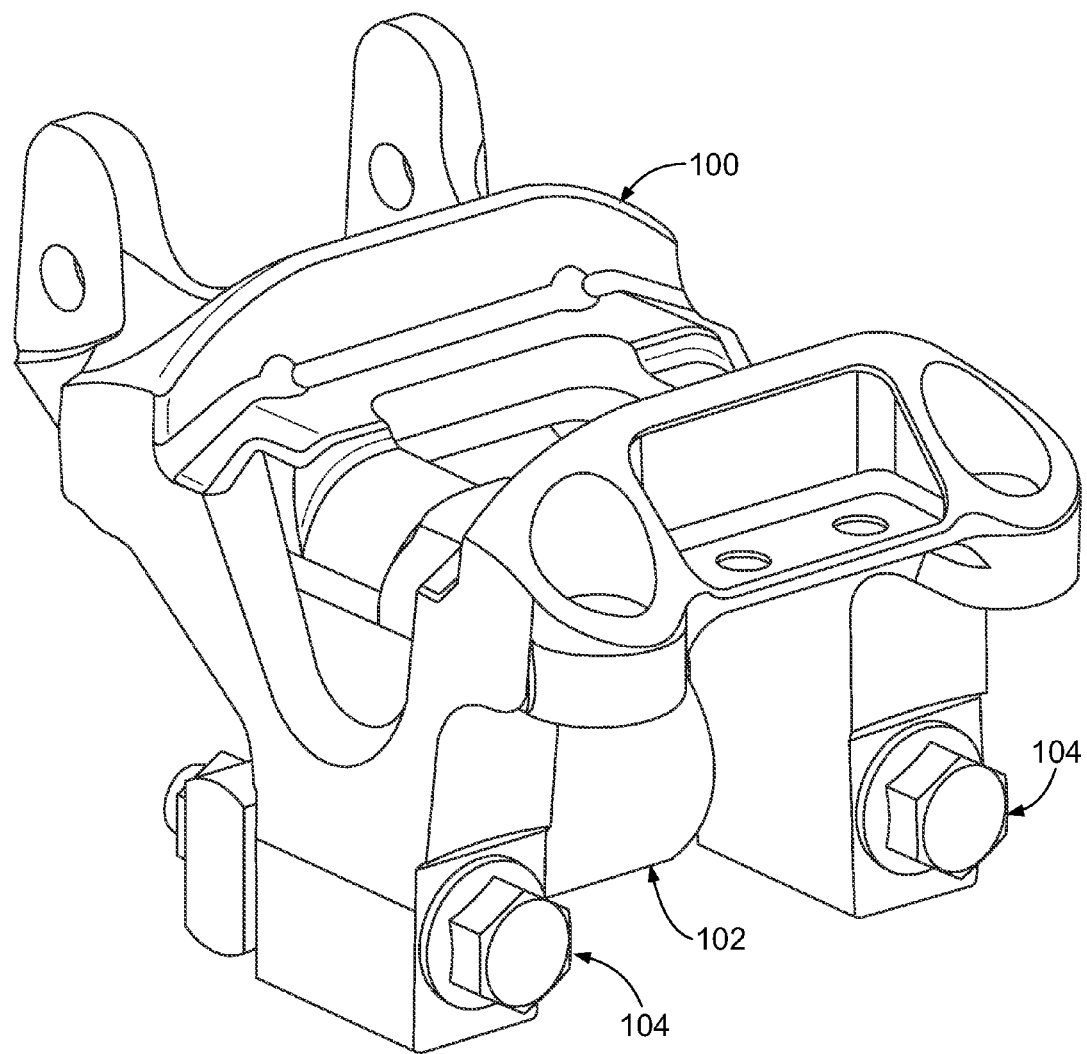
FIG. 18 is a rear perspective view of the bottom cap, D-pin bushing, and mechanical fastener assembly of FIG. 17.

More particularly, in the illustrated embodiment, the axle or first workpiece 10 includes a pair of generally parallel vertical walls 16a and 16b, with each vertical wall 16a, 16b including a bore 18a, 18b that is substantially aligned with the bore of the other wall. As best seen in FIG. 16, each vertical wall 16a, 16b may include a plurality of bores, with each bore being substantially aligned with a bore defined in the other vertical wall. As shown in FIGS. 2-9, each pair of bores may include a rigid brace 20 extending between the vertical walls 16a and 16b for preventing deformation of the vertical walls 16a and 16b when a force is applied thereto by a mechanical fastener assembly 14 during the joinder process, as will be described in greater detail herein.

Similar to the first workpiece 10, the axle wrap or second workpiece 12 also includes a pair of generally parallel vertical walls 22a and 22b, with each vertical wall 22a, 22b including a bore 24a, 24b that is substantially aligned with the bore of the other wall. Further, each vertical wall 22a, 22b may include a plurality of bores, with each bore being substantially aligned with a bore defined in the other vertical wall.

Prior to joinder, each vertical wall of the first workpiece 10 is positioned adjacent to and/or in contact with an associated vertical wall of the second workpiece 12, with each bore of the first workpiece 10 being positioned directly adjacent to and in alignment with a bore of the second workpiece 12. More particularly, bores 18a and 24a are positioned directly adjacent to and in alignment with each other, while bores 18b and 24b are positioned directly adjacent to and in alignment with each other (FIGS. 4-9). In the illustrated embodiment, these four bores 18a, 18b, 24a, and 24b are positioned in alignment with each other, although not necessarily directly adjacent to each other.

With the first and second workpieces 10 and 12 properly aligned, one or more components of the mechanical fastener assembly 14 may be inserted into the bores. According to one method of joining the first and second workpieces 10 and 12, a slotted collar 26a, 26b of the mechanical fastener assembly 14 is partially inserted into each pair of adjacent, aligned bores. One of the slotted collars 26a is shown in greater detail in FIGS. 10-13, but it should be understood that the other slotted collar 26b may be substantially identical. In other embodiments, two slotted collars of a single mechanical fastener assembly may be differently configured or, if there is only one set of adjacent, aligned bores, a mechanical fastener assembly may include only one slotted collar.

Figure 12:
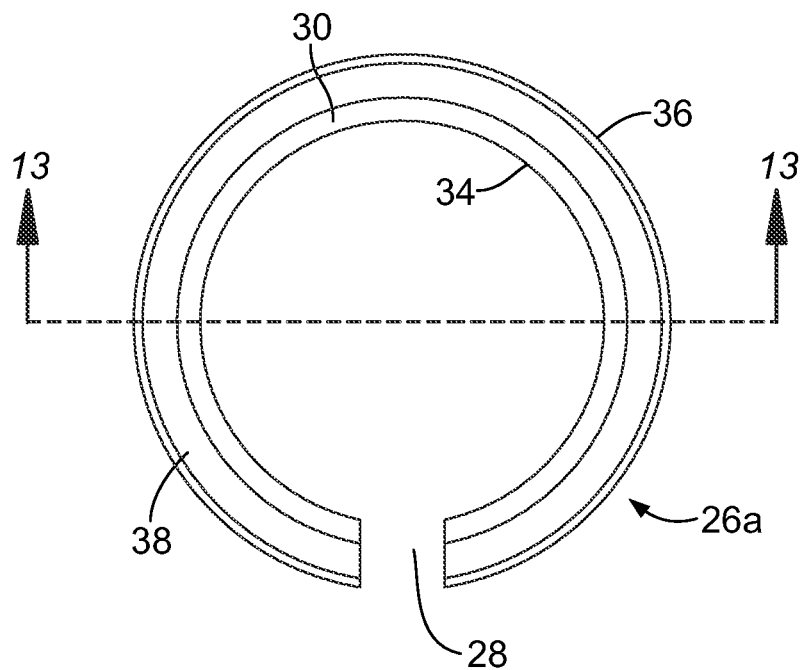
FIG. 12 is a top plan view of the slotted collar of FIG. 10.
Figure 13:
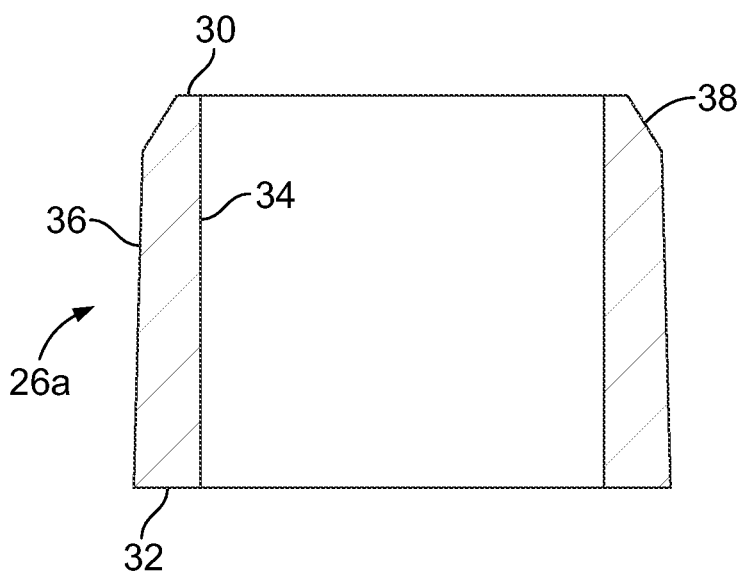
FIG. 13 is cross-sectional view of the slotted collar of FIG. 10, taken through the line 13-13 of FIG. 12.

As shown in greater detail in FIGS. 10-12, the slotted collar 26a may be generally annular, with a slot 28 defined in the wall of the slotted collar 26a to prevent the slotted collar 26a from defining a complete 360° ring. The illustrated slot 28 is substantially parallel to a central axis of the slotted collar 26a and extends between the ends 30 and 32 of the slotted collar 26a, but it is also within the scope of the present disclosure for the slot to be oriented at an angle with respect to the central axis of the slotted collar. In other embodiments, the slot may extend only part of the way between the ends of the slotted collar and/or have a varying width, rather than the substantially uniform width shown in the illustrated embodiment. It is also within the scope of the present disclosure for the slot to be relatively narrow or thin, as in the illustrated embodiment, or to be relatively wide, thereby limiting the arcuate extent of the wall of the slotted collar.

In the illustrated embodiment, the inner surface 34 of the slotted collar 26a has a substantially uniform diameter, while the outer surface 36 of the slotted collar 26a has a non-uniform diameter. In particular, the outer surface 36 of the illustrated slotted collar 26a is tapered to define a generally frusto-conical surface with a greater diameter at one end 32 than at the other end 30. The end 30 of the slotted collar 26a having the smaller outer diameter is referred to herein as the "lead-in end," as it is the end of the slotted collar that is preferably first inserted into the aligned bores of the workpieces, as will be described in greater detail herein.

In one embodiment, the outer surface 36 is tapered at approximately 1.5° with respect to the central axis of the slotted collar 26a, such that the outer surface 36 has a maximum diameter at one end 32 that gradually decreases in the direction of the other end 30. In other embodiments, the outer surface of the slotted collar may be tapered at a different angle or at a varying angle. It is also within the scope of the present disclosure for the outer surface of the slotted collar to be substantially un-tapered and to have a substantially uniform diameter or to have a diameter that varies without being tapered (e.g., having a stepped outer surface).

According to an aspect of the present disclosure that may be employed in combination with or separately from the above-described taper, one end 30 may include a chamfer 38. If provided in combination with a tapered outer surface 36 (as in the illustrated embodiment), it is preferable for chamfer 38 to be associated with the lead-in end 30 for improved performance when the slotted collar 26a is inserted into aligned bores, as will be described in greater detail herein. In other embodiments, where the diameter of the outer surface of the slotted collar is substantially uniform except in the location of the chamfer, it may be advantageous for the chamfered end to be inserted first into the aligned bore, as a chamfer provides the slotted collar with a self-alignment feature during insertion.

Turning back now to FIG. 4, the slotted collars 26a and 28b are at least partially inserted into the aligned bores, preferably with the lead-in end 30 first. If the outer surface of a slotted collar is tapered, it is preferable for at least a portion of the associated aligned bores to also be tapered. Most preferably, the associated set of aligned bores have a taper that matches the tapered outer surface of the slotted collar (e.g., with the aligned bores defining an approximately 1.5° taper when the outer surface of the slotted collar is tapered at approximately 1.5°). On the other hand, if the outer surface of a slotted collar is un-tapered, it is preferable for the associated aligned bores to also be un-tapered or to have a substantially uniform diameter. Preferably, at least a portion of the outer surface of the slotted collars 26a and 26b has a greater diameter than the associated set of aligned bores (for reasons that will be described in greater detail herein), in which case a tapered slotted collar and set of aligned bores may be preferred to an un-tapered slotted collar and aligned bores to the extent that it may be easier to partially insert a tapered slotted collar into a tapered set of aligned bores.

Figure 5:
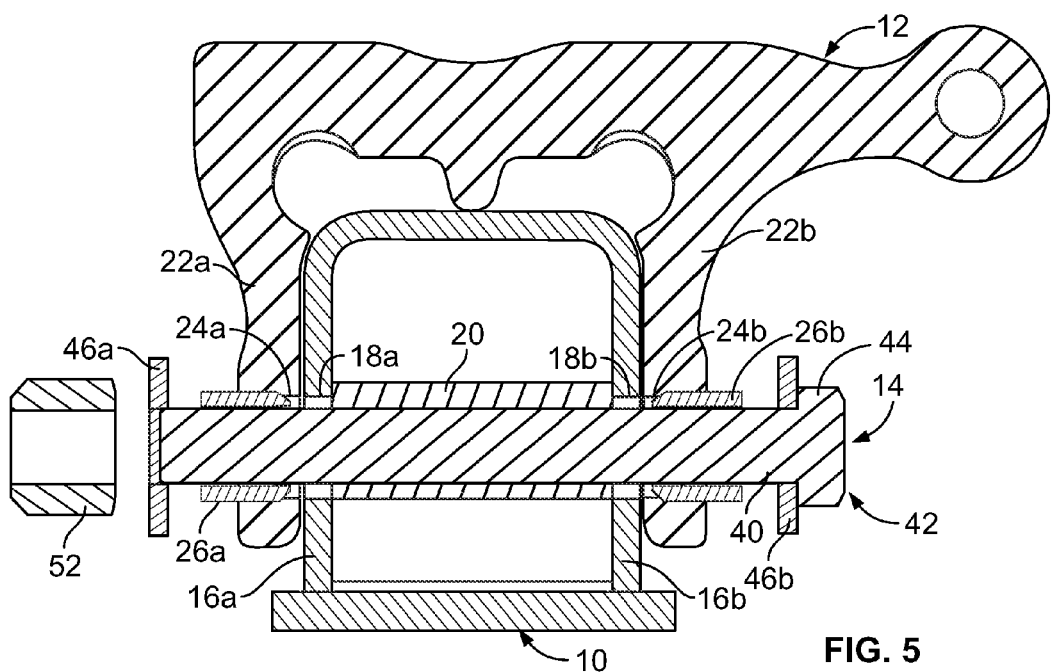

With the slotted collars 26a and 26b in place, other components of the mechanical fastener assembly 14 may be inserted into the aligned bores. In particular, the shaft or shank or elongated body 40 of a mechanical fastener 42 may be at least partially inserted into the aligned bores, as shown in FIG. 5. In the illustrated embodiment, the mechanical fastener 42 comprises a bolt, with a shaft 40 having an enlarged head or end piece 44 associated with one of its ends according to conventional design, but other mechanical fasteners having a shaft or shank or elongated body (e.g., a screw or tube) may also be used without departing from the scope of the present disclosure. The shaft 40 has a smaller outer diameter than the minimum inner diameter of the associated set of aligned bores, and may have a smaller outer diameter than the minimum inner diameter of the associated slotted collar or collars 26a, 26b, such that at least a portion of the shaft 40 is surrounded by or received within the collar(s). In such a configuration (as illustrated in FIG. 5), there is a gap between the outer surface of the shaft 40 and the aligned bores, with the slotted collar or collars 26a, 26b occupying at least a portion of that gap. Although the shaft 40 of the mechanical fastener 42 is shown as being inserted into the aligned bores after the slotted collars 26a and 26b, it is also within the scope of the present disclosure for the shaft to be inserted prior to or substantially at the same time as a slotted collar is inserted into a set of aligned bores.

With the shaft 40 of the mechanical fastener 42 at least partially inserted into the aligned bores, one or both of the slotted collars 26a, 26b may be further advanced into the associated set of aligned bores. If the outer surface of a slotted collar is tapered and/or includes a chamfered end, such a configuration may provide a self-centering or aligning feature as the slotted collar is further advanced into the adjacent, aligned bores. In the illustrated embodiment, the mechanical fastener assembly 14 is provided with a pair of rigid plates 46a and 46b, with one rigid plate 46a positioned adjacent to one of the slotted collars 26a and the other rigid plate 46b positioned adjacent to the other slotted collar 26b to contact the associated slotted collar and press it further into the associated set of aligned bores. Each rigid plate 46a, 46b includes a bore or through-hole or aperture 48 (FIG. 4) configured to receive the shaft 40 of the associated mechanical fastener 42. If multiple mechanical fasteners are provided (as in the illustrated embodiment), each rigid plate 46a, 46b may include one bore or through-hole or aperture for each mechanical fastener. Preferably, the bore 48 of the rigid plate or plates 46a and 46b have a diameter substantially the same as or slightly greater than the outer diameter of the shaft 40 of the associated mechanical fastener 42, such that the shaft 40 may pass through the bore 48 of rigid plate or plates 46a and 46b, but the associated slotted collar 26a, 26b cannot. In other embodiments, the rigid plate or plates may be differently configured (e.g., substantially annular rigid members or washers 50, as in FIG. 16) or the mechanical fastener assembly may be provided without a rigid plate. It may be preferable, however to provide a washer 50 or rigid plate 46a, 46b or the like in order to provide a substantially smooth contact surface for the end 32 of the slotted collar or collars 26a and 26b and/or to distribute any force applied to the workpieces 10 and/or 12 by the mechanical fastener 42 over a larger area.

Figure 6:
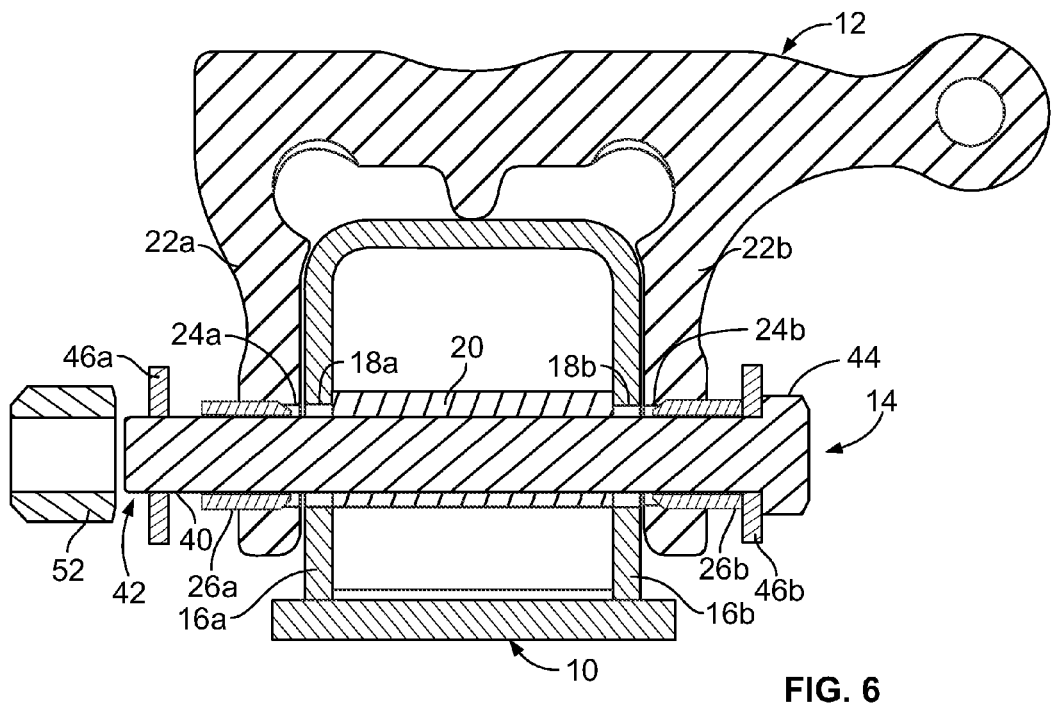
Figure 7:
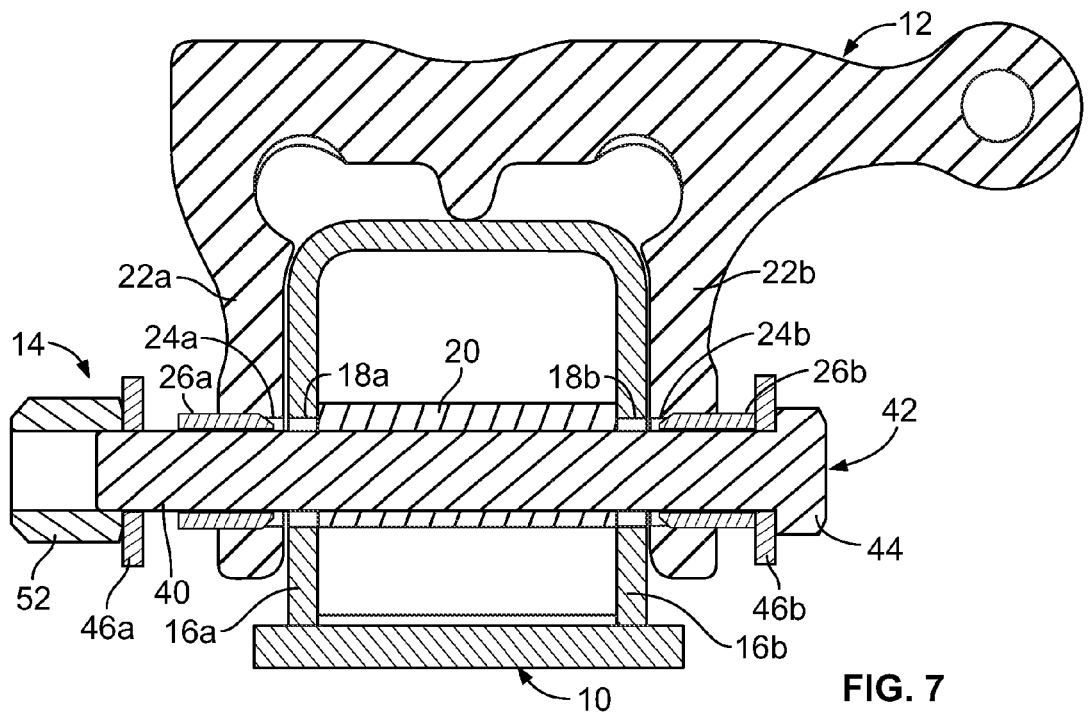
Figure 8:
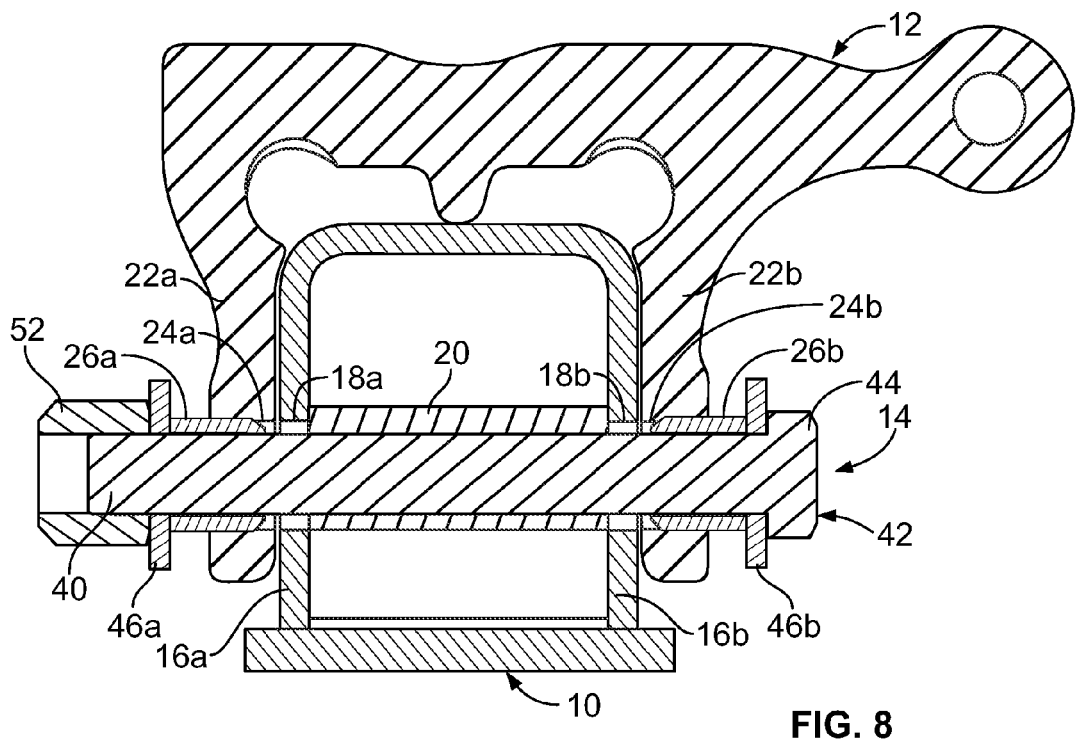

If the mechanical fastener 42 is provided as a bolt, as in the illustrated embodiment, a second enlarged end piece or nut 52 may be provided for connection to the end of the bolt opposite the bolt head 44. As shown in FIGS. 6-8, the nut 52 contacts one of the rigid plates 46a to move it along the shaft 40 and into contact with one of the slotted collars 26a, while the bolt head 44 contacts the other rigid plate 46b to move it into contact with the other slotted collar 26b. In the illustrated embodiment, tightening the nut 52 (FIGS. 7 and 8) brings the bolt head 44 and the nut 52 closer together, thereby pressing the rigid plates 46a and 46b against the slotted collars 26a and 26b, respectively, which are advanced further into the associated set of aligned bores until the rigid plates 46a and 46b contact the associated vertical walls 22a and 22b of the second workpiece 12 (FIG. 9). If provided, the brace 20 positioned between the vertical walls 16a and 16b of the first workpiece 10 helps to prevent deformation of the vertical walls 16a, 16b, 22a, and 22b when the nut 52 is tightened onto the mechanical fastener 42. While the slotted collars 26a and 26b are fully received within the associated aligned bores in the final configuration of FIG. 9, it is also within the scope of the present disclosure for a slotted collar to be only partially received within a set of aligned bores in a final configuration.

At least a portion of the outer surface of the slotted collar or collars 26a and 26b has a greater diameter than the associated set of aligned bores, such that fully pressing each slotted collar into its associated set of aligned bores causes the slot of the slotted collar to at least partially close, thereby decreasing the outer and inner diameters of the slotted collar. The slot 28, therefore, gives the slotted collar 26a, 26b improved flexibility to be usable in a variety of different applications, as the slot 28 effectively adjusts to a variety of tolerances between the bores and the shaft 40 of the mechanical fastener 42, as well as any other surfaces in the bores.

Preferably, the slotted collar or collars 26a and 26b are configured such that the associated set of aligned bores presses the slotted collar 26a, 26b into contact with the shaft 40 of the mechanical fastener 42, thereby placing at least a portion of the inner surface 34 of the slotted collar 26a, 26b into contact or engagement with the shaft 40 of the mechanical fastener 42 and placing at least a portion of the outer surface 36 of the slotted collar 26a, 26b into contact or engagement with the associated aligned bores. By contacting both the shaft 40 of the mechanical fastener 42 and the aligned bores, the slotted collar or collars 26a and 26b create a shear joint to secure the workpieces 10 and 12 together, effectively transforming a bolted joint into a riveted joint. Employing a shear joint instead of a bolted joint allows for a sufficiently strong connection between the workpieces 10 and 12 using fewer and lighter mechanical fasteners than would be necessary in a bolted joint connecting the workpieces 10 and 12. Preferably, all or a large percentage of the inner surface 34 of the slotted collar or collars 26a and 26b contacts the shaft 40, while all or a large percentage of the outer surface 36 of the slotted collar or collars 26a and 26b contacts the aligned bores to create a stronger shear joint.

Preferably, the slotted collar or collars 26a and 26b are configured to elastically deform to the final configuration of FIG. 9, rather than inelastically or permanently deforming. By such a configuration, the mechanical fastener assembly 14 may be used to create a shear joint (as described above), while still being fully removable from the workpieces 10 and 12 for servicing. In one embodiment, the slotted collar or collars 26a and 26b are formed of a metal material, such as steel (e.g., 1008-1050 steel in a preferred embodiment), but other materials may also be used without departing from the scope of the present disclosure.

Figure 14:
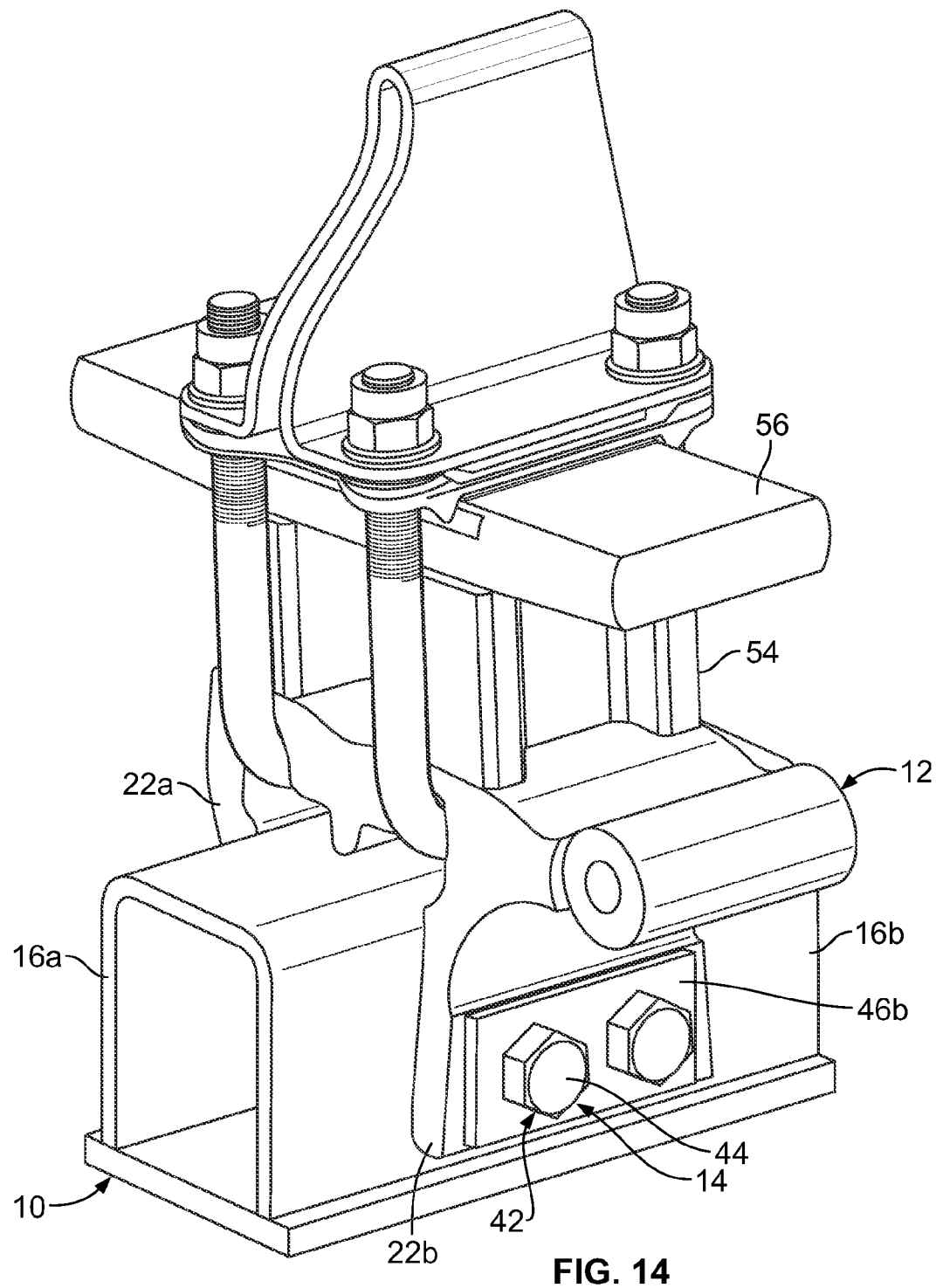
FIG. 14 is a perspective view of the vehicle axle, suspension system component, and mechanical fastener assembly of FIG. 1, showing additional components of the suspension system.
Figure 15:
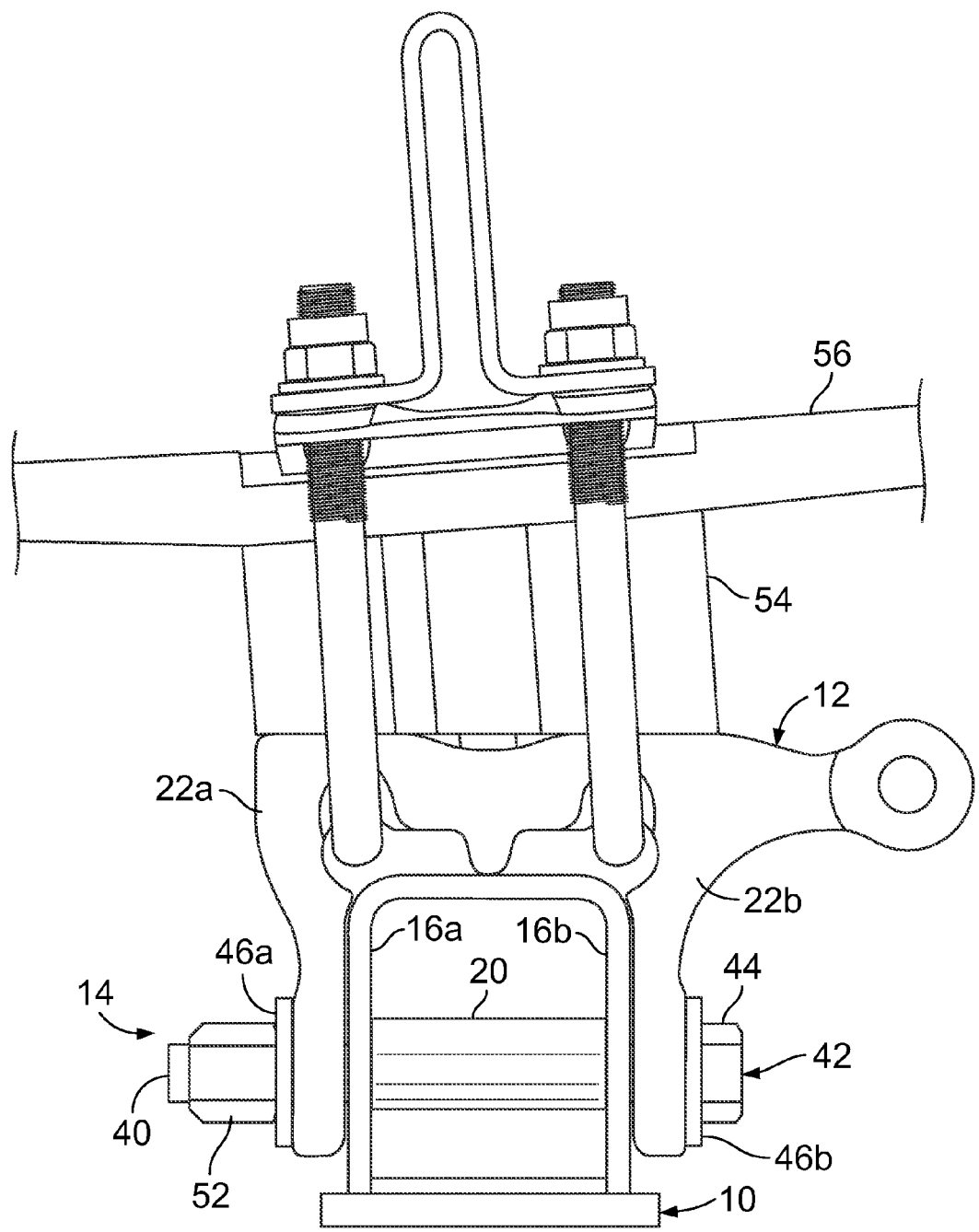
FIG. 15 is a side elevational view of the vehicle axle, suspension system components, and mechanical fastener assembly of FIG. 14.

Once the shear joint has been formed, additional structures (e.g., a spacer 54 and a leaf spring 56, in the illustrated embodiment) may be connected to the workpieces 10 and 12, as shown in FIGS. 14 and 15. Alternatively, one or more of the additional structures may be connected to one or both of the workpieces 10 and 12 prior to joining the workpieces 10 and 12.

As referenced above, FIG. 16 illustrates an alternative embodiment of a mechanical fastener assembly 14' that may be used to join the two workpieces 10 and 12. The mechanical fastener assembly 14' of FIG. 16 is substantially identical to the embodiment of FIGS. 1-9, except that the rigid plates 46a and 46b are replaced by washers 50. Other such variations to the mechanical fastener assembly (e.g., using a screw or tube instead of a bolt as the mechanical fastener) may also be employed without departing from the scope of the present disclosure.

It should again be emphasized that the embodiments of mechanical fastener assemblies and workpieces of FIGS. 1-16 are merely exemplary. The illustrated embodiments employ multiple mechanical fastener assemblies, with the shaft of each mechanical fastener assembly passing through multiple sets of adjacent, aligned bores and each mechanical fastener assembly including multiple slotted collars (one for each set of adjacent, aligned bores). In other embodiments, more or fewer mechanical fastener assemblies may be employed, with the shaft of each passing through more or fewer than two sets of adjacent, aligned bores and with each mechanical fastener assembly having more or fewer than two slotted collars. For example, FIGS. 17-21 show a relatively simple embodiment of the present disclosure, in which a shear joint between two workpieces is formed using a mechanical fastener and a single slotted collar.

Figure 19:
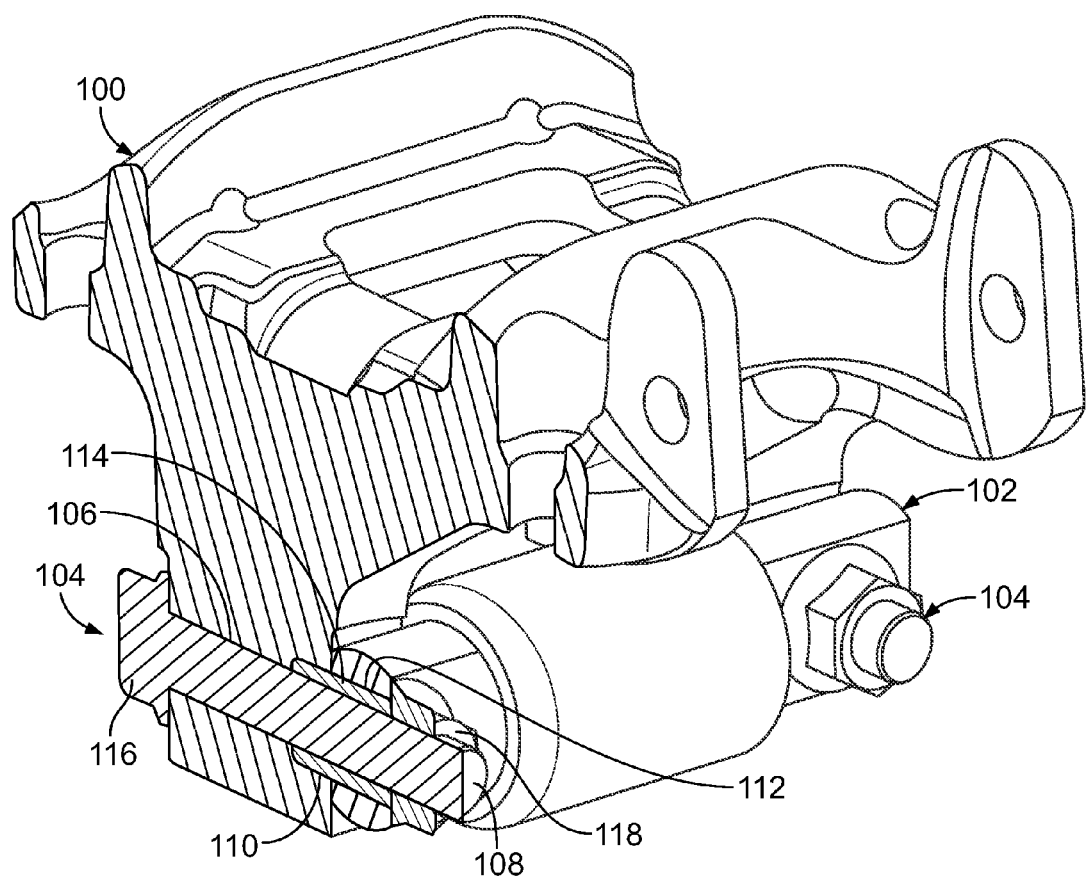
FIGS. 19 and 20 are cross-sectional views of the bottom cap, D-pin bushing, and mechanical fastener assembly of FIG. 17.
Figure 20:
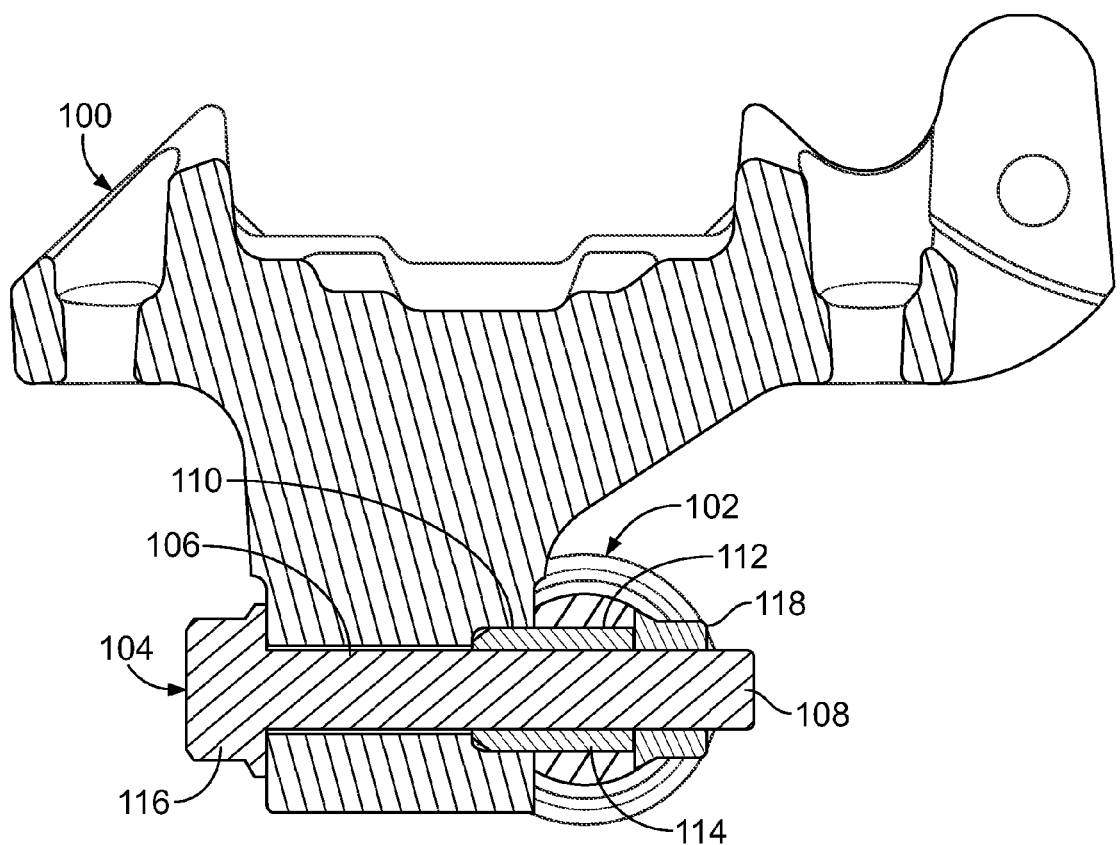
Figure 21:
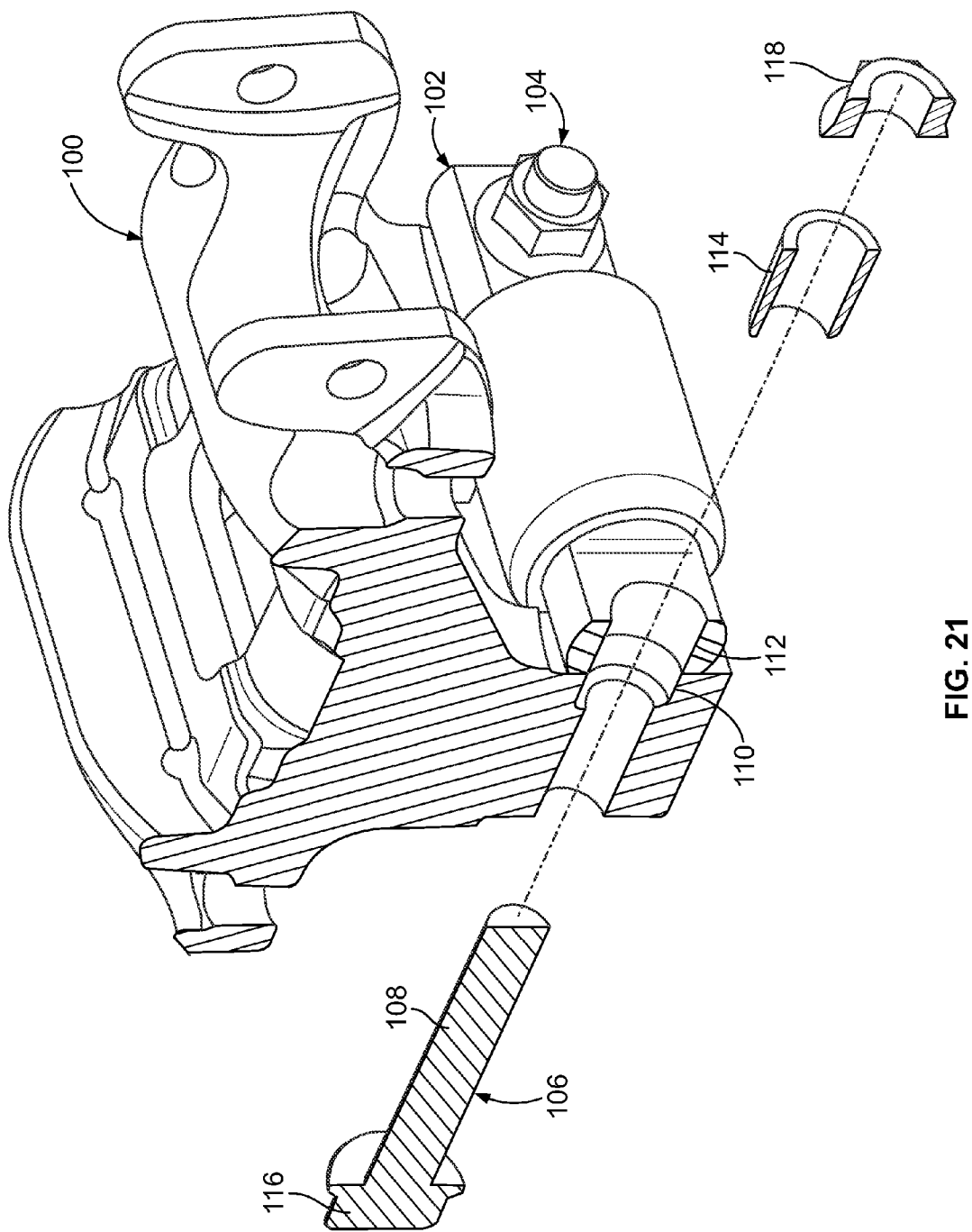
FIG. 21 is a cross-sectional, exploded view of the bottom cap, D-pin bushing, and mechanical fastener assembly of FIG. 17.
Figure 22:
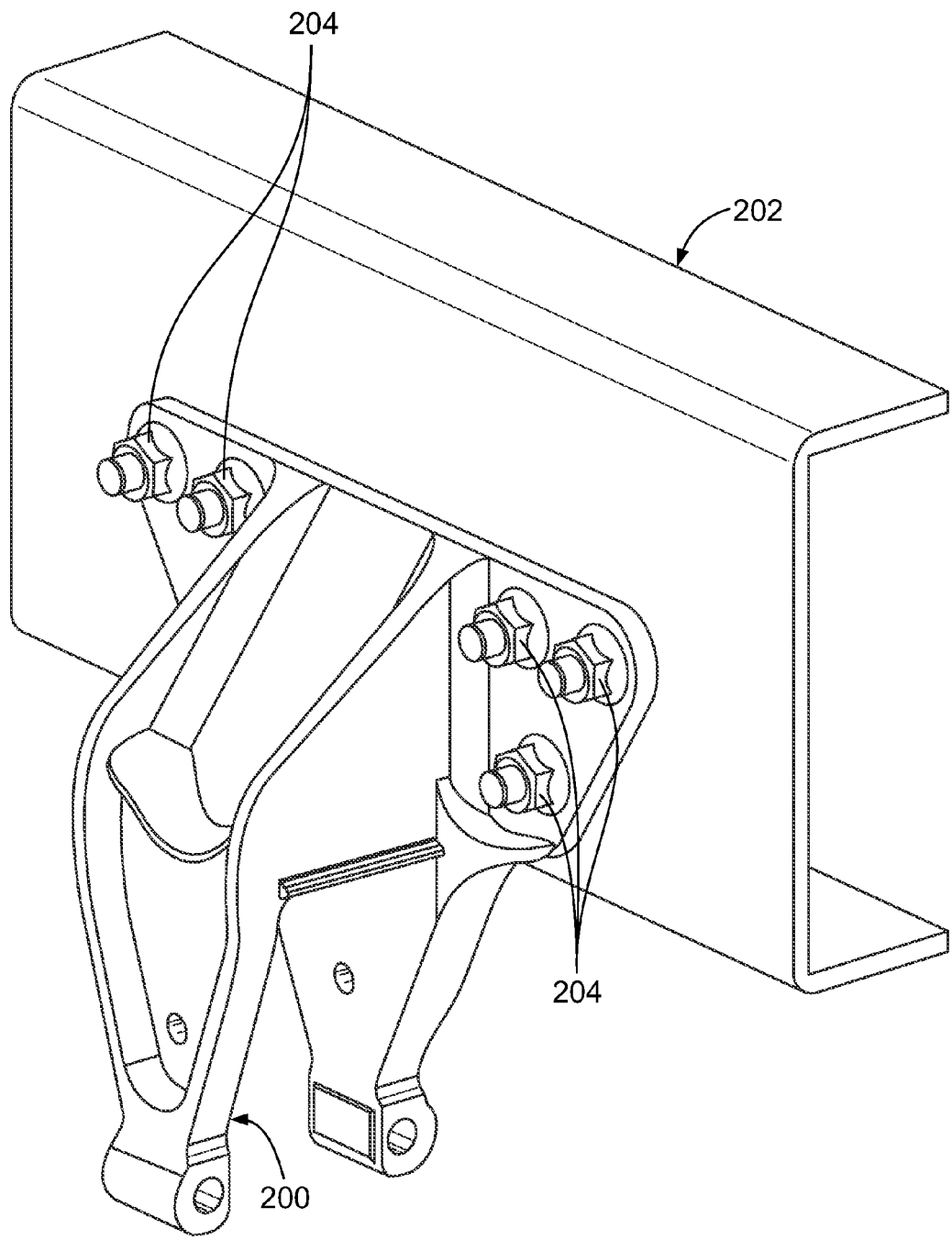
FIG. 22 is a front perspective view of another two different workpieces, shown as a frame hanger of a vehicle suspension system and a vehicle frame, secured together by a mechanical fastener assembly according to an aspect of the present disclosure.
Figure 23:
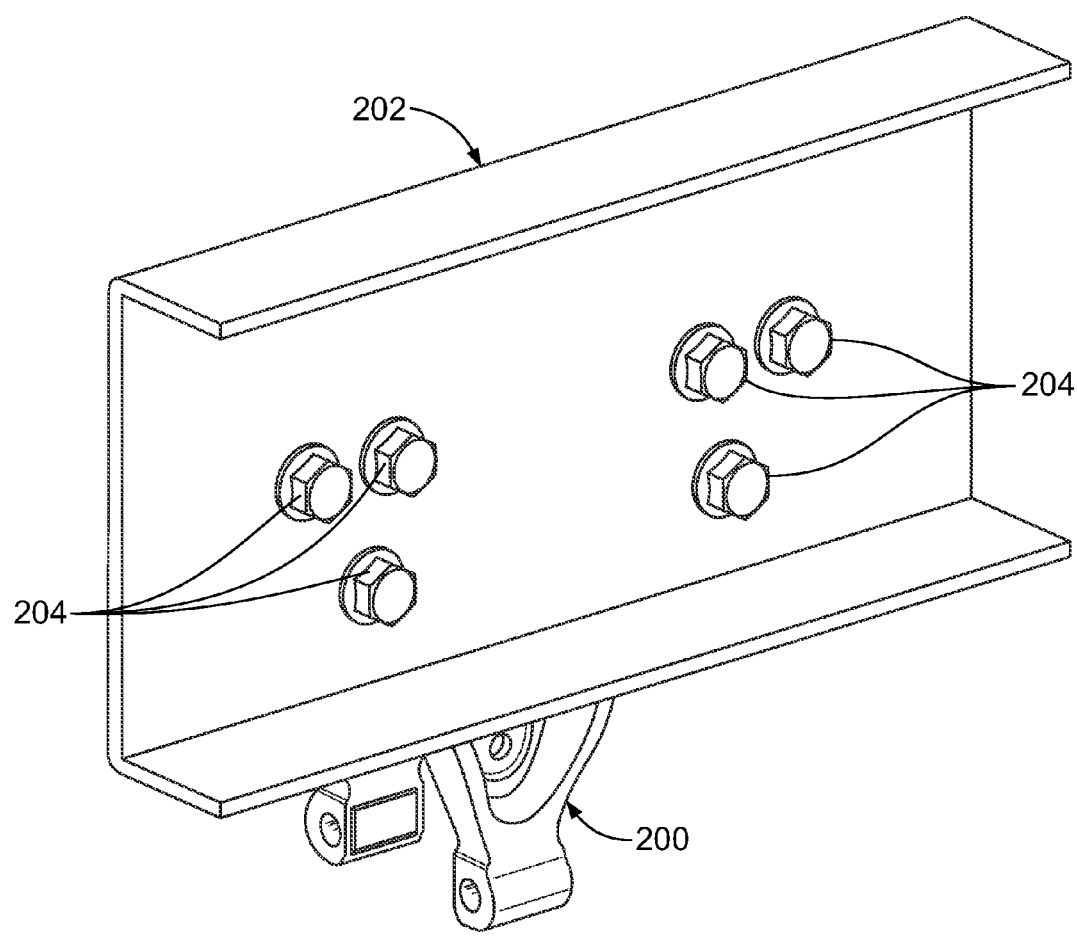
FIG. 23 is a rear perspective view of the frame hanger, vehicle frame, and mechanical fastener assembly of FIG. 22.

In the embodiment of FIGS. 17-21, a first workpiece 100 comprises a bottom cap of a vehicle suspension system and a second workpiece 102 comprises a D-pin bushing secured to the bottom cap 100 at two locations by two substantially identical, separate mechanical fastener assemblies 104. As best seen in FIGS. 19-21, each mechanical fastener assembly 104 comprises a mechanical fastener 106 having a shaft 108 configured to be at least partially received within a single set of adjacent, aligned bores 110 and 112 of the workpieces 100 and 102. The mechanical fastener assembly 104 also includes a slotted collar 114 of the type described in greater detail above, which is also at least partially received within the adjacent, aligned bores 110 and 112 of the workpieces 100 and 102 to form a shear joint between the workpieces 100 and 102. Similar to the mechanical fastener 42 described above, the mechanical fastener 106 of FIGS. 17-21 includes an enlarged head or end piece 116, with a separate second enlarged end piece or nut 118 that may be secured to an opposite end of the shaft 108 by mating threads or the like. In contrast to the embodiments of FIGS. 1-16, it is the second enlarged end piece 118 that bears against the trailing end of the slotted collar 114 to seat it within the aligned bores 110 and 112 of the workpieces 100 and 102 as the second enlarged end piece 118 is advanced onto the shaft 108 of the mechanical fastener 106, but the slotted collar 114 operates otherwise as described above to provide a shear joint connection. The mechanical fastener assembly 106 of FIGS. 17-21 may include additional components (e.g., a rigid plate/washer of the type described above in connection with the embodiments of FIGS. 1-16), but any such additional components are merely optional. Further, it is also within the scope of the present disclosure for the two mechanical fastener assemblies 104 illustrated in FIGS. 17-21 to be differently configured, rather than being identical.

Figure 24:
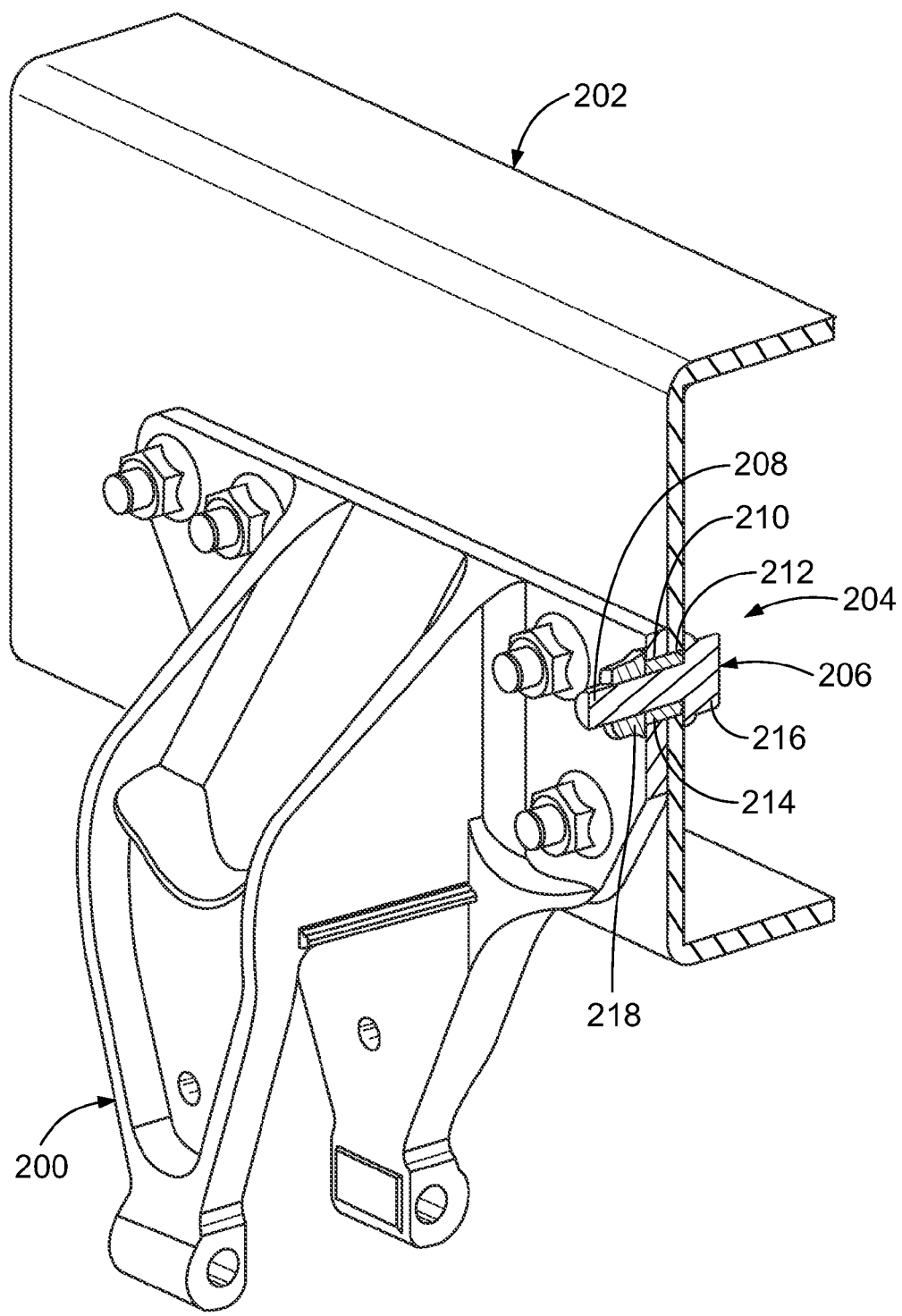
FIGS. 24 and 25 are cross-sectional views of the frame hanger, vehicle frame, and mechanical fastener assembly of FIG. 22.
Figure 25:
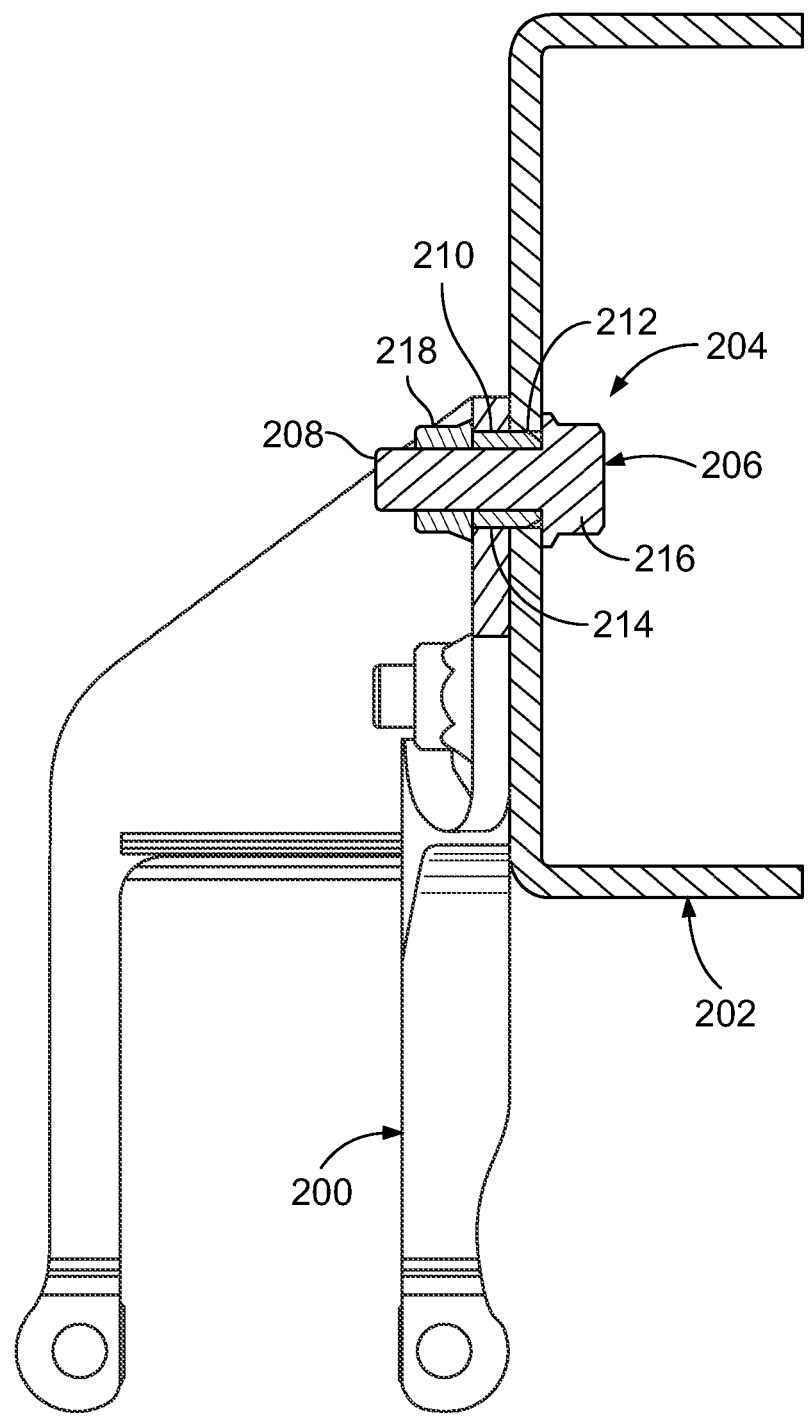
Figure 26:
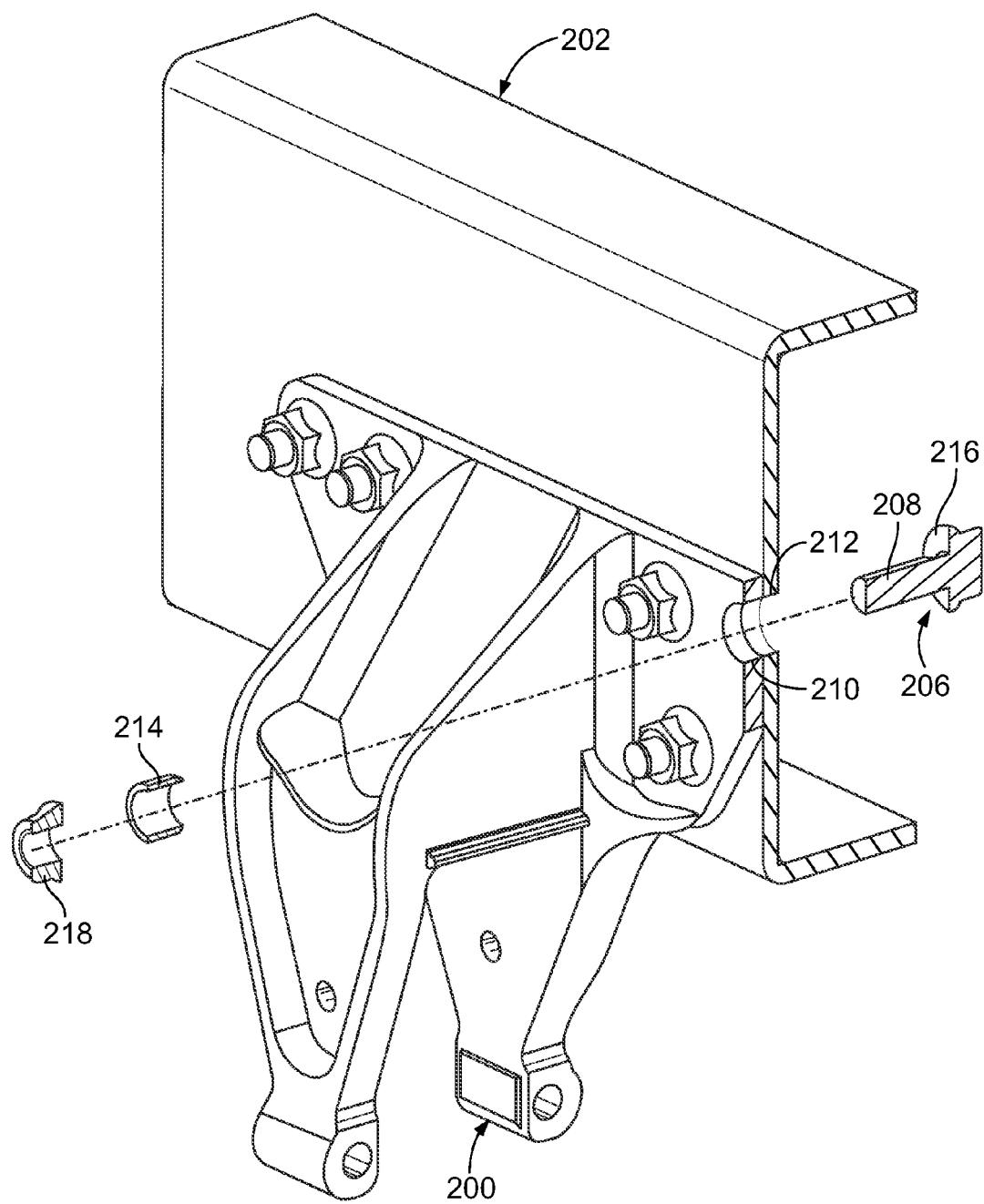
FIG. 26 is a cross-sectional, exploded view of the frame hanger, vehicle frame, and mechanical fastener assembly of FIG. 22.
Figure 27:
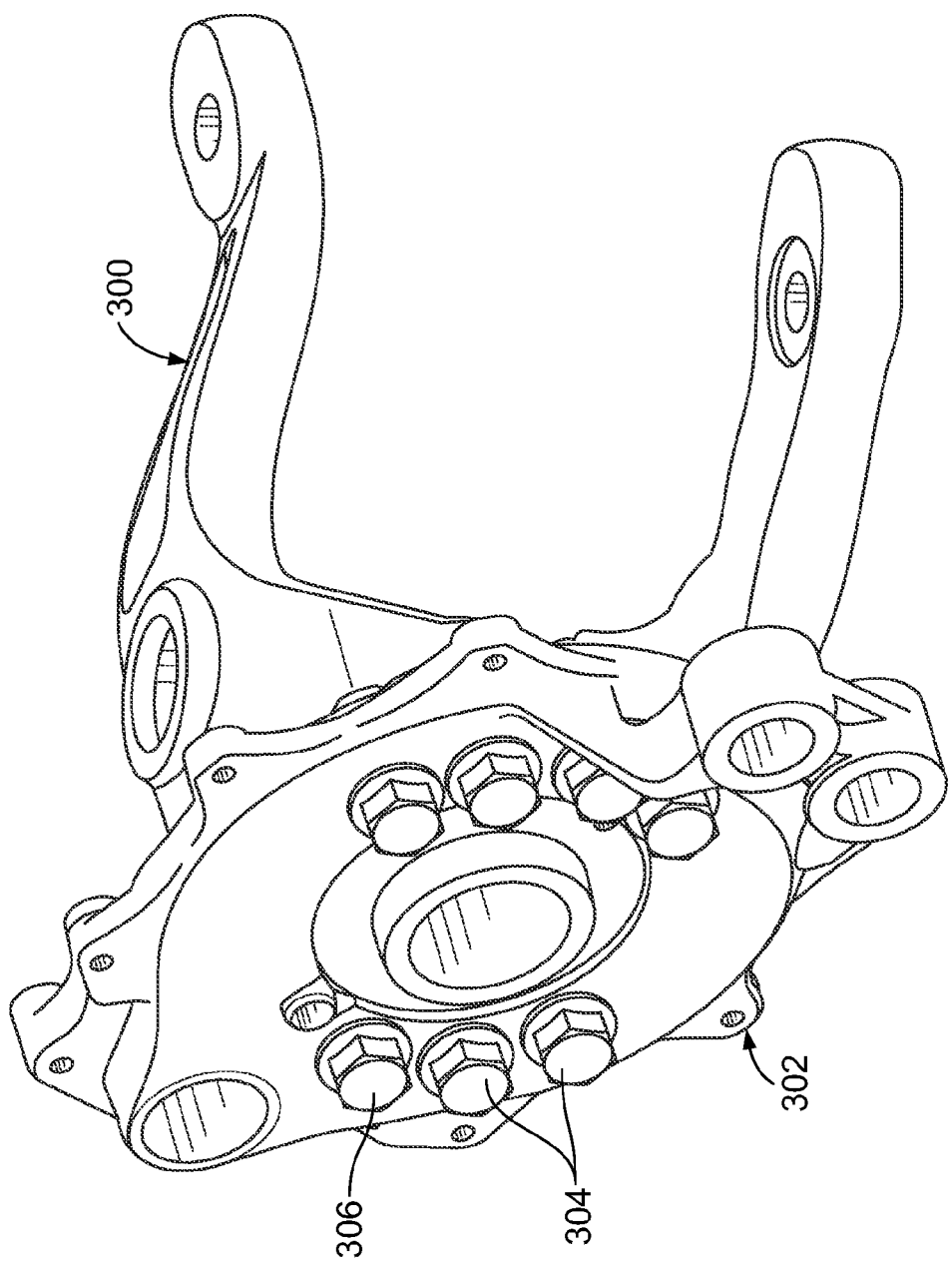
FIG. 27 is a front perspective view of two more different workpieces, shown as a steering knuckle and a brake component of a vehicle steering and braking system, secured together by a mechanical fastener assembly according to an aspect of the present disclosure.
Figure 28:
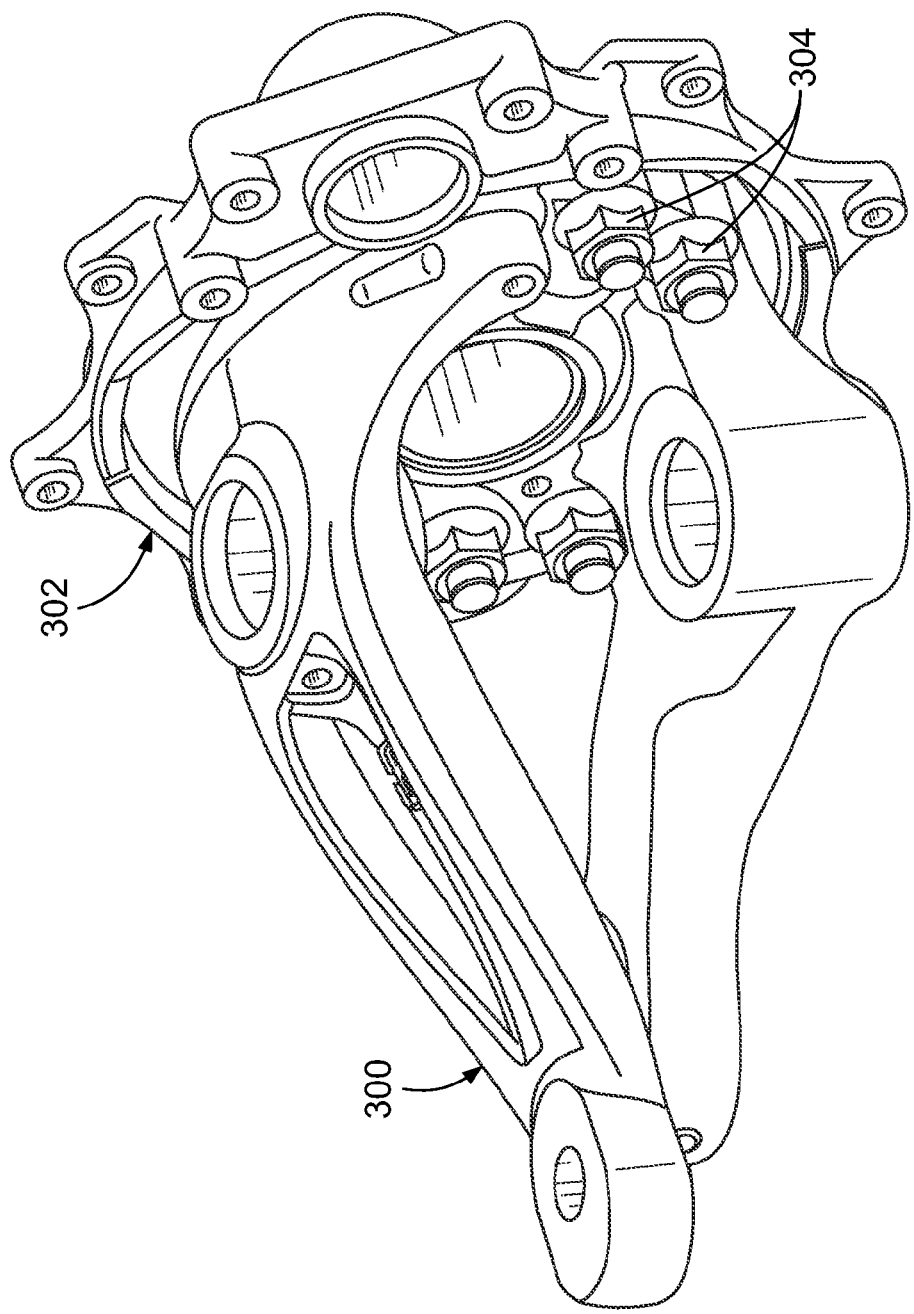
FIG. 28 is a rear perspective view of the steering knuckle, brake component, and mechanical fastener assembly of FIG. 27.

FIGS. 22-26 illustrate another example of two workpieces 200 and 202 connected by one or more mechanical fastener assemblies 204 that provide a shear joint connection. In the embodiment of FIGS. 22-26, the first workpiece 200 comprises a frame hanger of a vehicle suspension system and the second workpiece 202 comprises a vehicle frame to which the frame hanger 200 is secured at multiple locations by a plurality of substantially identical, separate mechanical fastener assemblies 204. As best seen in FIGS. 24-26, each mechanical fastener assembly 204 comprises a mechanical fastener 206 having a shaft 208 configured to be at least partially received within a single set of adjacent, aligned bores 210 and 212 of the workpieces 200 and 202. The mechanical fastener assembly 204 also includes a slotted collar 214 of the type described in greater detail above, which is also at least partially received within the adjacent, aligned bores 210 and 212 of the workpieces 200 and 202 to form a shear joint between the workpieces 200 and 202. Similar to the mechanical fastener 42 described above, the mechanical fastener 206 of FIGS. 22-26 includes an enlarged head or end piece 216, with a separate second enlarged end piece or nut 218 that may be secured to an opposite end of the shaft 208 by mating threads or the like.

Similar to the embodiment of FIGS. 17-21, it is the second enlarged end piece 218 that bears against the trailing end of the slotted collar 214 to seat it within the aligned bores 210 and 212 of the workpieces 200 and 212 as the second enlarged end piece 218 is advanced onto the shaft 208 of the mechanical fastener 206 to provide a shear joint connection. The mechanical fastener assembly 204 of FIGS. 22-26 may include additional components (e.g., a rigid plate/washer of the type described above in connection with the embodiments of FIGS. 1-16), but any such additional components are merely optional. Further, it is also within the scope of the present disclosure for the mechanical fastener assemblies 204 illustrated in FIGS. 22-26 to be differently configured, rather than being identical.

Figure 29:
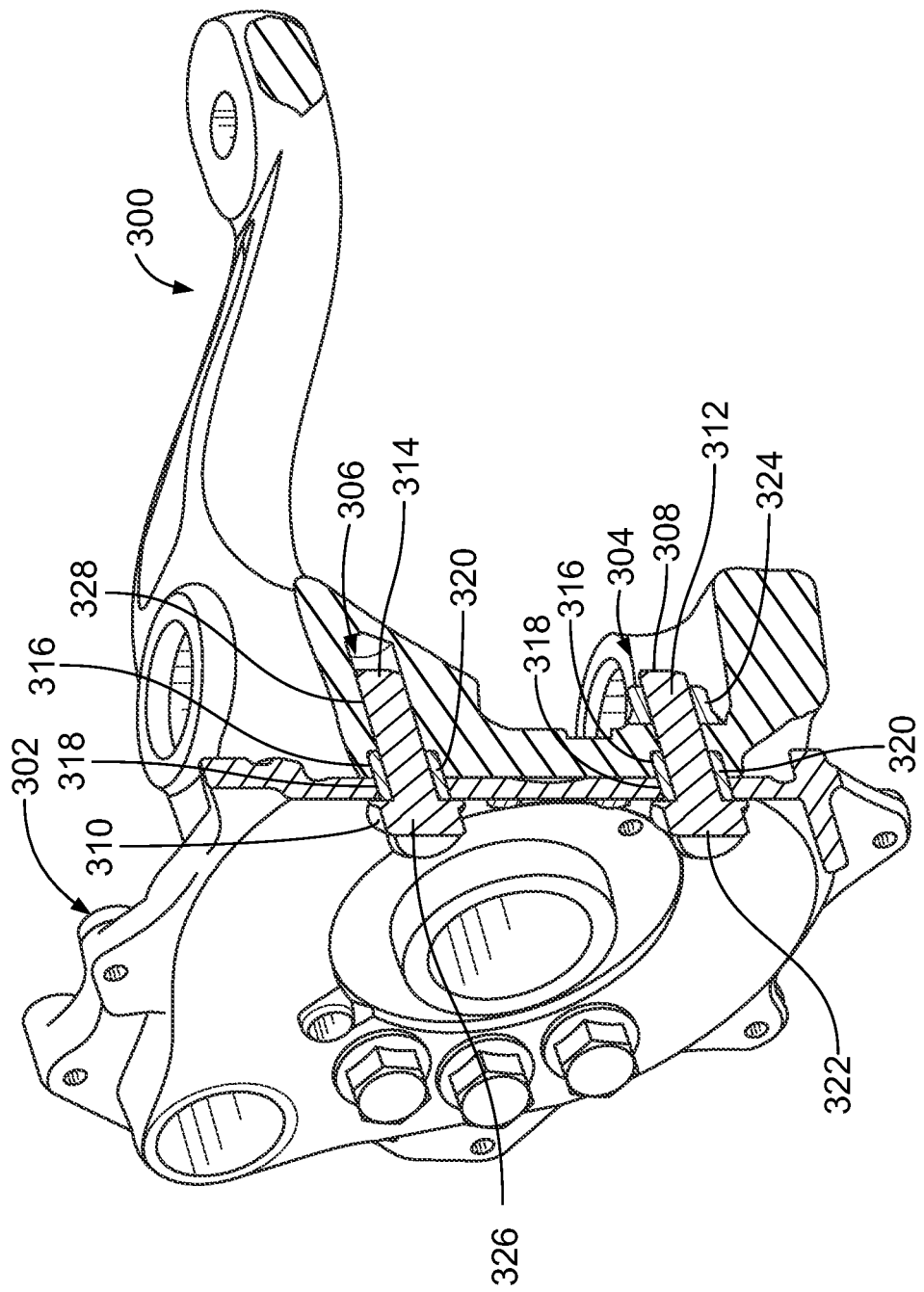
FIGS. 29 and 30 are cross-sectional views of the steering knuckle, brake component, and mechanical fastener assembly of FIG. 27.
Figure 30:
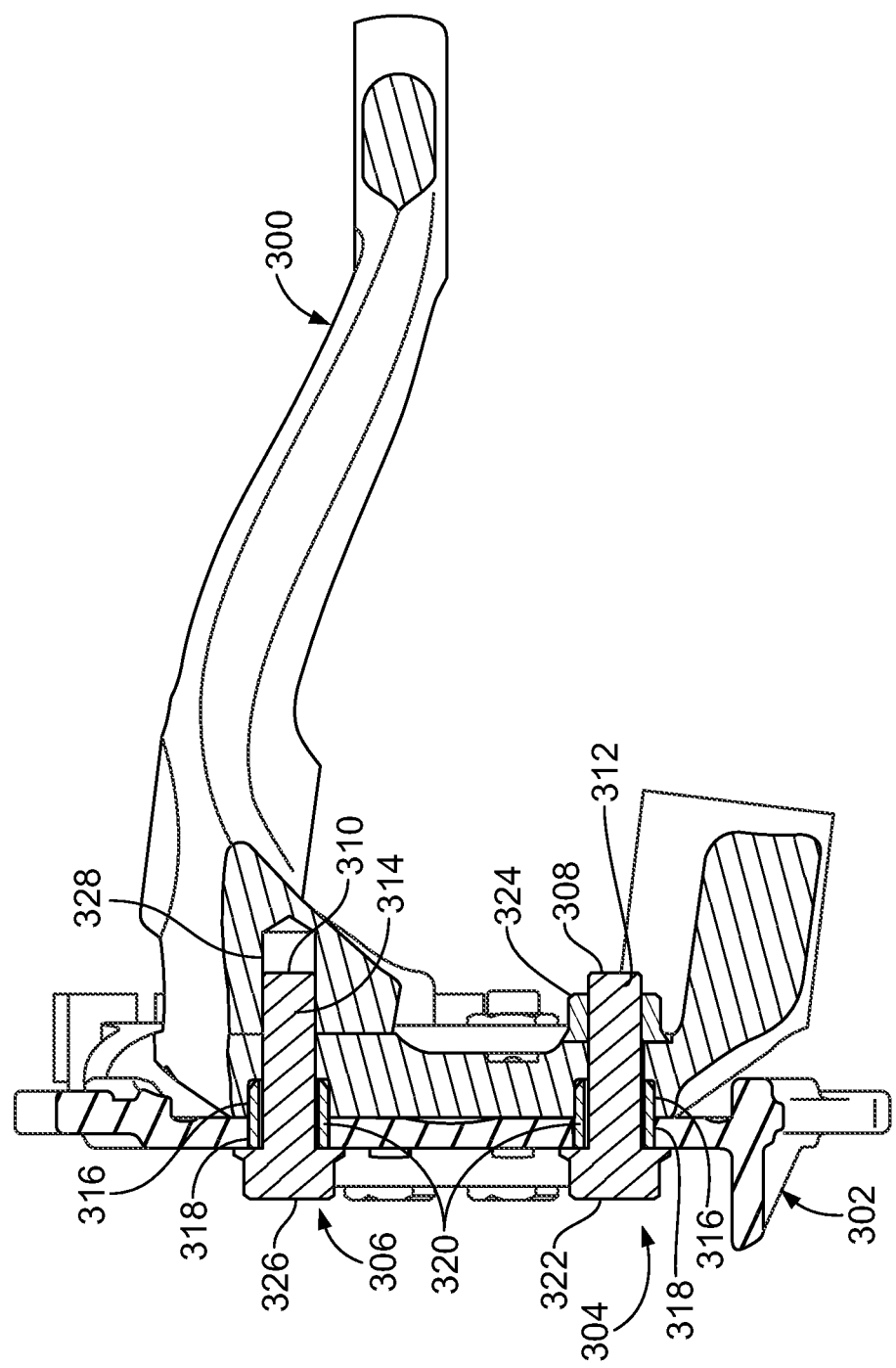
Figure 31:
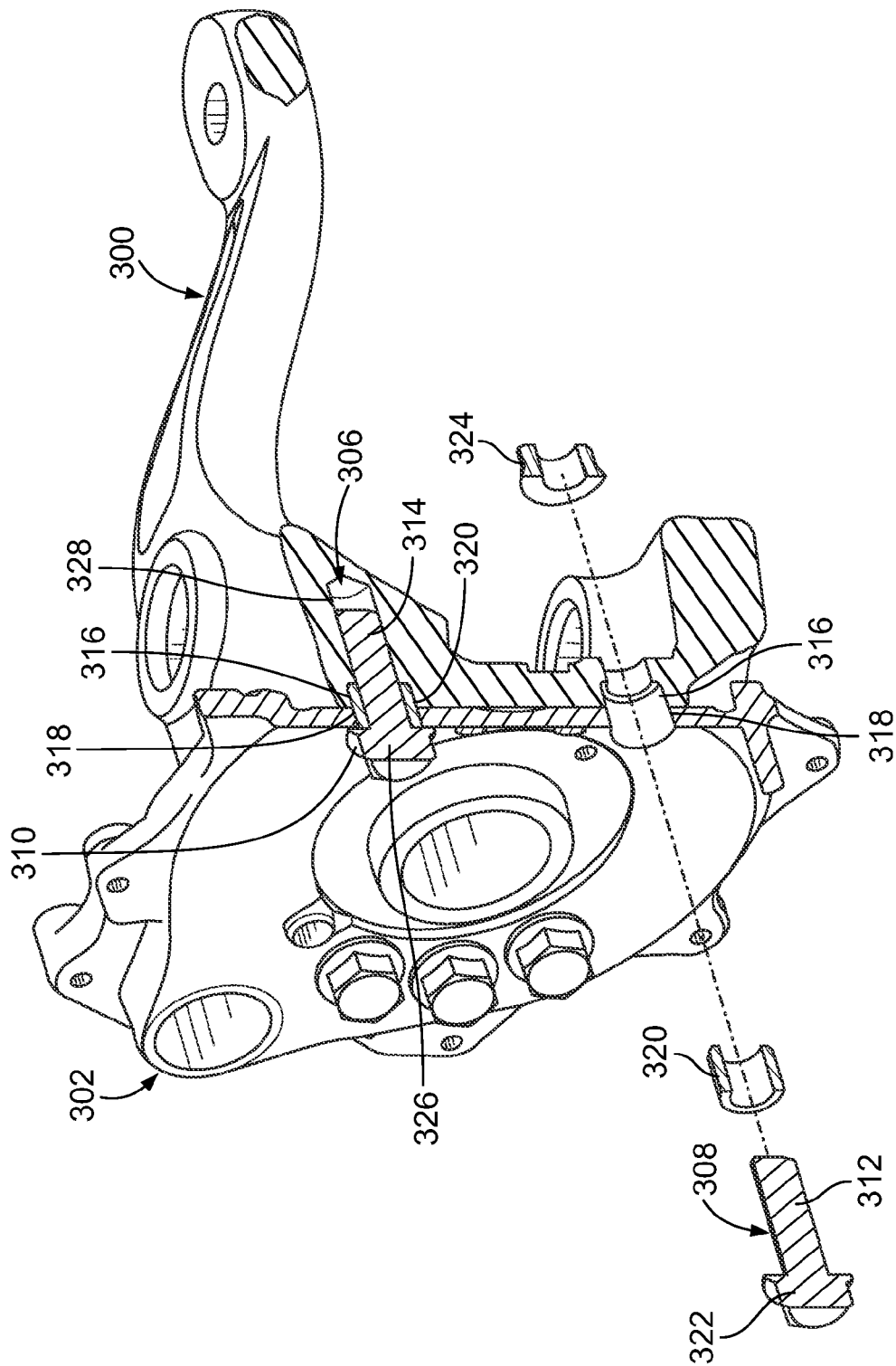
FIG. 31 is a cross-sectional, exploded view of the steering knuckle, brake component, and mechanical fastener assembly of FIG. 27.

FIGS. 27-31 illustrate yet another example of two workpieces 300 and 302 connected by one or more mechanical fastener assemblies that provide a shear joint connection. In the embodiment of FIGS. 27-31, the first workpiece 300 comprises a steering knuckle and the second workpiece 302 comprises a brake component, both of a vehicle steering and braking system, which are secured together at multiple locations by a plurality of separate, differently configured mechanical fastener assemblies 304 and 306. As best seen in FIGS. 29-31, each mechanical fastener assembly 304, 306 comprises a mechanical fastener 308, 310 having a shaft 312, 314 configured to be at least partially received within a single set of adjacent, aligned bores 316 and 318 of the workpieces 300 and 302. Each mechanical fastener assembly 304, 306 also includes a slotted collar 320 of the type described in greater detail above, which is also at least partially received within the adjacent, aligned bores 316 and 318 of the workpieces 300 and 302 to form a shear joint between the workpieces 300 and 302. Similar to the mechanical fastener 42 described above, the lower mechanical fastener 308 of FIGS. 27-31 includes an enlarged head or end piece 322, with a separate second enlarged end piece or nut 324 that may be secured to an opposite end of the shaft 312 by mating threads or the like. As in the embodiments of FIGS. 1-16, the first enlarged end piece 322 bears against the trailing end of the slotted collar 322 to seat it within the aligned bores 316 and 318 of the workpieces 300 and 302 as the second enlarged end piece 324 is advanced onto the shaft 312 of the mechanical fastener 308 to provide a shear joint connection.

As for the upper mechanical fastener assembly 306, its mechanical fastener 310 includes a first enlarged end piece 326 integrally formed with the shaft 314 and configured to contact the trailing end of the slotted collar 320 to seat it within the aligned bores 316 and 318, but there is no second enlarged end piece provided. Instead, at least a portion of the bore of one or both of the workpieces (illustrated as a portion 328 of the bore 316 of the first workpiece 300) is configured to engage and retain the shaft 314 as the shaft 314 is advanced into the aligned bores 316 and 318. In a preferred embodiment, the outer surface of the shaft 314 includes threads that are mated with threads defined in one or both of the bores 316 and 318 of the workpieces 300 and 302 to retain the shaft 314 as it is rotatably advanced into the bores 316 and 318 to seat the slotted collar 320 and provide a shear joint connection. If the second enlarged end piece 324 of the lower mechanical fastener assembly 304 is configured to be secured to the associated shaft 312 by mating threads, the mechanical fasteners 308 and 310 of the lower and upper mechanical fastener assemblies 304 and 306 may be identical; otherwise, it is also within the scope of the present disclosure for the mechanical fasteners 308 and 310 to be differently configured. Other means of securing the shaft 314 of the upper mechanical fastener assembly 306 within the bores 316 and 318 may also be provided without departing from the scope of the present disclosure. The mechanical fastener assemblies 304 and 306 of FIGS. 27-31 may include additional components (e.g., a rigid plate/washer of the type described above in connection with the embodiments of FIGS. 1-16), but any such additional components are merely optional.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to a mechanical fastener assembly alone, a mechanical fastener assembly in combination with multiple workpieces to define a joint, and/or a method of joining multiple workpieces.

The invention claimed is:

1. A joint comprising:
   a first workpiece having a first bore;
   a second workpiece having a second bore aligned with the first bore;
   a mechanical fastener having a shaft extending between first and second ends and at least partially received within the aligned bores of the first and second workpieces; and
   a slotted collar surrounding at least a portion of the shaft of the mechanical fastener and entirely received within the aligned bores of the first and second workpieces, wherein
   the slotted collar defines a slot extending between first and second ends of the slotted collar,
   an outer surface of the slotted collar is tapered from a maximum diameter at the first end of the slotted collar to a minimum diameter at the second end of the slotted collar, and
   engages at least a portion of both of the aligned bores of the first and second workpieces and the first bore and/or the second bore is tapered to mate with the tapered outer surface of the slotted collar.

2. The joint of claim 1, wherein the mechanical fastener further includes an enlarged end piece associated with one of the first and second ends of the shaft.

3. The joint of claim 2, wherein the mechanical fastener comprises a bolt and further comprising a nut configured to be connected to the other one of the first and second ends of the shaft.

4. The joint of claim 2, further comprising a rigid plate including an aperture receiving a portion of the shaft, wherein the entire rigid plate is positioned outside of the first and second bores and contacts the enlarged end piece, the slotted collar, and one of the workpieces.

5. The joint of claim 2, wherein the entire enlarged end piece is positioned outside of the first and second bores.

6. The joint of claim 1, wherein the slotted collar comprises an inner surface having a substantially uniform diameter.

7. The joint of claim 1, wherein the shaft has a substantially uniform outer diameter.

8. The joint of claim 1, further comprising a second slotted collar surrounding at least a portion of the shaft of the mechanical fastener and at least partially received within the aligned bores of the first and second workpieces, wherein an inner surface of the second slotted collar engages at least a portion of the shaft of the mechanical fastener, and an outer surface of the second slotted collar engages at least a portion of the aligned bores of the first and second workpieces.

9. The joint of claim 1, wherein only a portion of the shaft is received within the aligned bores of the first and second workpieces.

10. A joint comprising:

a first workpiece having a first bore;

a second workpiece having a second bore aligned with the first bore;

a mechanical fastener having a shaft extending between first and second ends and at least partially received within the aligned bores of the first and second workpieces; and a slotted collar surrounding at least a portion of the shaft of the mechanical fastener and entirely received within the aligned bores of the first and second workpieces, wherein the slotted collar defines a slot extending between first and second ends of the slotted collar, an outer surface of the slotted collar is tapered from a maximum diameter at the first end of the slotted collar to a minimum diameter at the second end of the slotted collar, and engages at least a portion of the aligned bores of the first and second workpieces, and one of the first and second ends of the slotted collar is chamfered.

11. The joint of claim 10, wherein the second end of the slotted collar is chamfered.

12. A joint comprising a first workpiece having a first bore;

a second workpiece having a second bore aligned with the first bore;

a mechanical fastener having a shaft extending between first and second ends and at least partially received within the aligned bores of the first and second workpieces; and a slotted collar surrounding at least a portion of the shaft of the mechanical fastener and entirely received within the aligned bores of the first and second workpieces, wherein the slotted collar defines a slot extending between first and second ends of the slotted collar, an outer surface of the slotted collar is tapered from a maximum diameter at the first end of the slotted collar to a minimum diameter at the second end of the slotted collar, and engages at least a portion of the aligned bores of the first and second workpieces, and the entire shaft is received within the aligned bores of the first and second workpieces.

13. A joint comprising:

a first workpiece having a first bore;

a second workpiece having a second bore aligned with the first bore;

a mechanical fastener having a shaft extending between first and second ends and at least partially received within the aligned bores of the first and second workpieces;

a first slotted collar surrounding at least a portion of the shaft of the mechanical fastener and entirely received within the aligned bores of the first and second workpieces; and a second slotted collar surrounding at least a portion of the shaft of the mechanical fastener and at least partially received within the aligned bores of the first and second workpieces, wherein an inner surface of each slotted collar engages at least a portion of the shaft of the mechanical fastener, and an outer surface of each slotted collar engages at least a portion of the aligned bores of both of the first and second workpieces.

* * * * *